US012756526B2

(12) United States Patent
Xu et al.

(10) Patent No.: US 12,756,526 B2
(45) Date of Patent: Oct. 6, 2026

(54) TECHNIQUES FOR CROSS-LINK INTERFERENCE MEASUREMENT PRIORITIZATION

(71) Applicant: QUALCOMM Incorporated, San Diego, CA (US)

(72) Inventors: Huilin Xu, Temecula, CA (US); Qunfeng He, San Diego, CA (US); Yuwei Ren, Beijing (CN)

(73) Assignee: QUALCOMM INCORPORATED, San Diego, CA (US)

(*) Notice: Subject to any disclaimer, the term of this patent is extended or adjusted under 35 U.S.C. 154(b) by 353 days.

(21) Appl. No.: 18/549,890

(22) PCT Filed: Jun. 4, 2021

(86) PCT No.: PCT/CN2021/098311
§ 371 (c)(1),
(2) Date: Sep. 8, 2023

(87) PCT Pub. No.: WO2022/252210
PCT Pub. Date: Dec. 8, 2022

(65) Prior Publication Data
US 2024/0154771 A1 May 9, 2024

(51) Int. Cl.
*H04L 5/00* (2006.01)
*H04B 17/345* (2015.01)
(Continued)

(52) U.S. Cl.
CPC ......... *H04L 5/0064* (2013.01); *H04B 17/345* (2015.01); *H04L 5/0048* (2013.01);
(Continued)

(58) Field of Classification Search
None
See application file for complete search history.

(56) References Cited

U.S. PATENT DOCUMENTS

2017/0086153 A1* 3/2017 Yoon .................... H04W 56/001
2021/0067991 A1* 3/2021 Zhu .......................... H04W 8/24
2022/0124533 A1* 4/2022 Li ............................ H04W 8/22

FOREIGN PATENT DOCUMENTS

WO WO-2020144624 A1 * 7/2020 ............ H04W 24/10
WO WO-2020204405 A1 10/2020
(Continued)

OTHER PUBLICATIONS

3GPP TS 38.306 V16.4.0 (Mar. 2021), 3rd Generation Partnership Project; Technical Specification Group Radio Access Network; NR; User Equipment (UE) radio access capabilities (Year: 2021).*
(Continued)

*Primary Examiner* — Jay L Vogel
(74) *Attorney, Agent, or Firm* — Holland & Hart LLP

(57) ABSTRACT

Methods, systems, and devices for wireless communications are described. A first user equipment (UE) may transmit, to a base station, capability signaling including an indication of a capability of the first UE to prioritize reception of downlink messages scheduled via a first type of scheduling which at least partially overlap with resources used to perform cross-link interference (CLI) measurements. The first UE may receive control signaling indicating a first set of resources for a downlink message, and additional control signaling indicating a second set of resources usable by the first UE to perform CLI measurements on signals transmitted by a second UE, where the second set of resources at least partially overlap with the first set of resources in a time domain. The first UE may then receive the downlink message from the base station within the first set of resources based on the indication of the capability.

30 Claims, 16 Drawing Sheets

(51) Int. Cl.
*H04W 8/24* (2009.01)
*H04W 24/10* (2009.01)
*H04W 28/02* (2009.01)
*H04W 72/541* (2023.01)

(52) U.S. Cl.
CPC .......... *H04L 5/0053* (2013.01); *H04L 5/0062* (2013.01); *H04L 5/0073* (2013.01); *H04L 5/0094* (2013.01); *H04W 28/0215* (2013.01); *H04W 72/541* (2023.01); *H04L 5/0007* (2013.01); *H04W 8/245* (2013.01); *H04W 24/10* (2013.01)

(56) References Cited

FOREIGN PATENT DOCUMENTS

| | | | |
|---|---|---|---|
| WO | WO-2020252339 | A1 | 12/2020 |
| WO | WO-2021183612 | | 9/2021 |

OTHER PUBLICATIONS

AT&T, et al., "RAN1 UE Features List for Rel-16 NR after RAN1#100-E", 3GPP TSG RAN WG1 #100-e, e-Meeting, R1-2001484, 3rd Generation Partnership Project, Mobile Competence Centre, 650, Route Des Lucioles, F-06921, Sophia-Antipolis Cedex, France, vol. RAN WG1, No. e-meeting, Feb. 24, 2020-Mar. 6, 2020, Apr. 10, 2020, XP051873231, pp. 1-237, pp. 176, 177, The section 4, p. 119-123, pp. 88, 145.

International Search Report and Written Opinion—PCT/CN2021/098311—ISA/EPO—Dec. 6, 2021 (2104761WO1).

NTT DOCOMO, Inc., "Summary on UE Features for CLI/RIM", 3GPP TSG RAN WG1 #100bis-e, R1-2002455, 3rd Generation Partnership Project (3GPP), Mobile Competence Centre, 650, Route Des Lucioles, F-06921, Sophia-Antipolis Cedex, France, vol. RAN WG1, No. e-Meeting, Apr. 20, 2020-Apr. 30, 2020, Apr. 18, 2020, XP051876655, 15 pages.

Samsung: "UE Features for CLI/RIM", 3GPP Draft, 3GPP TSG RAN WG1 #100bis-e, R1-2002158, 3rd Generation Partnership Project (3GPP), Mobile Competence Centre, 650, Route Des Lucioles, F-06921, Sophia-Antipolis Cedex, France, vol. RAN WG1, No. e-Meeting; Apr. 20, 2020-Apr. 30, 2020, Apr. 10, 2020 (Apr. 10, 2020), XP051873466, 3 pages, paragraph [002.].

ZTE, et al., "Discussion on UE Feature for CLI", 3GPP Draft, R1-2001588, 3GPP TSG RAN WG1 #100bis, 3rd Generation Partnership Project (3GPP), Mobile Competence Centre, 650, Route Des Lucioles, F-06921, Sophia-Antipolis Cedex, France, vol. RAN WG1, No. e-Meeting, Apr. 20, 2020-Apr. 30, 2020, Apr. 11, 2020 (Apr. 11, 2020), XP051875179, 6 Pages, paragraphs [002.] , [02 .1], the whole document.

* cited by examiner

TECHNIQUES FOR CROSS-LINK INTERFERENCE MEASUREMENT PRIORITIZATION

CROSS REFERENCE

The present Application is a 371 national stage filing of International PCT Application No. PCT/CN2021/098311 by XU et al. entitled “TECHNIQUES FOR CROSS-LINK INTERFERENCE MEASUREMENT PRIORITIZATION,” filed Jun. 4, 2021, which is assigned to the assignee hereof, and which is expressly incorporated by reference in its entirety herein.

FIELD OF TECHNOLOGY

The following relates to wireless communications, including techniques for cross-link interference (CLI) measurement prioritization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may experience cross-link interference (CLI) attributable to signals transmitted by other UEs. For example, a “victim” UE may experience CLI from signals transmitted by an “aggressor” UE in cases where downlink resources of the victim UE overlap with uplink resources of the aggressor UE, thereby resulting in CLI. However, some UEs may be unable to simultaneously perform CLI measurements and receive downlink messages (e.g., physical downlink shared channel (PDSCH) messages) from the network.

SUMMARY

The described techniques relate to improved methods, systems, devices, and apparatuses that support techniques for cross-link interference (CLI) measurement prioritization. Generally, aspects of the present disclosure support techniques which enable user equipments (UEs) to prioritize reception of semi-statically and/or semi-persistently scheduled downlink messages over semi-statically scheduled CLI measurements. For example, a UE may receive control signaling which schedules CLI measurement resources and a downlink message which at least partially overlaps with the CLI measurement resources. In this example, the UE may transmit capability signaling to the network indicating that the UE is able to prioritize reception of the semi-statically scheduled downlink message which overlaps with CLI measurement resources. In this example, the network may transmit the downlink message based on the UE capability, and the UE may subsequently receive the semi-statically scheduled downlink message. As a result of receiving the semi-statically scheduled downlink message, the UE may refrain from performing the conflicting CLI measurements.

A method for wireless communication at a first UE is described. The method may include transmitting, to a base station, capability signaling including an indication of a capability of the first UE to prioritize reception of downlink messages scheduled via a first type of scheduling which at least partially overlap with resources used to perform CLI measurements, receiving, from the base station, control signaling indicating a first set of resources for a downlink message from the base station to the first UE, receiving, from the base station, additional control signaling indicating a second set of resources usable by the first UE to perform CLI measurements on signals transmitted by a second UE, where the second set of resources at least partially overlap with the first set of resources in a time domain, and receiving the downlink message from the base station within the first set of resources based on the indication of the capability.

An apparatus for wireless communication at a first UE is described. The apparatus may include a processor, memory coupled with the processor, and instructions stored in the memory. The instructions may be executable by the processor to cause the apparatus to transmit, to a base station, capability signaling including an indication of a capability of the first UE to prioritize reception of downlink messages scheduled via a first type of scheduling which at least partially overlap with resources used to perform CLI measurements, receive, from the base station, control signaling indicating a first set of resources for a downlink message from the base station to the first UE, receive, from the base station, additional control signaling indicating a second set of resources usable by the first UE to perform CLI measurements on signals transmitted by a second UE, where the second set of resources at least partially overlap with the first set of resources in a time domain, and receive the downlink message from the base station within the first set of resources based on the indication of the capability.

Another apparatus for wireless communication at a first UE is described. The apparatus may include means for transmitting, to a base station, capability signaling including an indication of a capability of the first UE to prioritize reception of downlink messages scheduled via a first type of scheduling which at least partially overlap with resources used to perform CLI measurements, means for receiving, from the base station, control signaling indicating a first set of resources for a downlink message from the base station to the first UE, means for receiving, from the base station, additional control signaling indicating a second set of resources usable by the first UE to perform CLI measurements on signals transmitted by a second UE, where the second set of resources at least partially overlap with the first set of resources in a time domain, and means for receiving the downlink message from the base station within the first set of resources based on the indication of the capability.

A non-transitory computer-readable medium storing code for wireless communication at a first UE is described. The code may include instructions executable by a processor to transmit, to a base station, capability signaling including an indication of a capability of the first UE to prioritize reception of downlink messages scheduled via a first type of scheduling which at least partially overlap with resources used to perform CLI measurements, receive, from the base station, control signaling indicating a first set of resources for a downlink message from the base station to the first UE, receive, from the base station, additional control signaling indicating a second set of resources usable by the first UE to perform CLI measurements on signals transmitted by a second UE, where the second set of resources at least partially overlap with the first set of resources in a time domain, and receive the downlink message from the base station within the first set of resources based on the indication of the capability.

Some examples of the method, apparatuses, and non-transitory computer-readable medium described herein may further include operations, features, means, or instructions for refraining from performing the CLI measurements within the second set of resources based on the indication of the capability.

In some examples of the method, apparatuses, and non-transitory computer-readable medium described herein, the second set of resources include a set of multiple CLI measurement instances and the method, apparatuses, and non-transitory computer-readable medium may include further operations, features, means, or instructions for receiving one or more signals from the second UE within a second CLI measurement instance of the set of multiple CLI measurement instances, where the second CLI measurement instance may be subsequent to the first CLI measurement instance and performing the CLI measurements on the one or more signals received within the second CLI measurement instance based on refraining from performing the CLI measurements within the first CLI measurement instance.

In some examples of the method, apparatuses, and non-transitory computer-readable medium described herein, transmitting the capability signaling may include operations, features, means, or instructions for transmitting an indication of one or more offset values, where each offset value of the one or more offset values includes a quantity of symbols following reception of the downlink message from the base station during which the first UE may be unable to perform CLI measurements.

In some examples of the method, apparatuses, and non-transitory computer-readable medium described herein, transmitting the capability signaling may include operations, features, means, or instructions for transmitting an indication of a first set of one or more characteristics associated with a first offset value and transmitting an indication of a second set of one or more characteristics associated with a second offset value, where the first set of one or more characteristics, the second set of one or more characteristics, or both, includes a subcarrier spacing (SCS), a frequency range, a type of CLI measurement, or any combination thereof.

In some examples of the method, apparatuses, and non-transitory computer-readable medium described herein, the indication of the capability of the first UE to prioritize reception of downlink messages which at least partially overlap with resources used to perform CLI measurements further includes an indication of a second capability of the UE to support one or more pre-defined offset values, and each pre-defined offset value of the one or more pre-defined offset values includes a quantity of symbols following reception of the downlink message during which the first UE may be unable to perform CLI measurements.

In some examples of the method, apparatuses, and non-transitory computer-readable medium described herein, transmitting the capability signaling may include operations, features, means, or instructions for transmitting an indication of a first priority configuration associated with a first relative priority between reception of downlink messages scheduled via the first type of scheduling and CLI-RSSI measurements and transmitting an indication of a second priority configuration associated with a second relative priority between reception of downlink messages scheduled via the first type of scheduling and SRS-RSRP CLI measurements, where the first UE receives the downlink message in accordance with the first priority configuration or the second priority configuration.

In some examples of the method, apparatuses, and non-transitory computer-readable medium described herein, transmitting the capability signaling may include operations, features, means, or instructions for transmitting an indication of a first set of one or more parameters associated with the first priority configuration, the first set of one or more parameters associated with a first capability of the first UE to prioritize reception of downlink messages scheduled via the first type of scheduling over CLI-RSSI measurements and transmitting an indication of a second set of one or more parameters associated with the second priority configuration, the second set of one or more parameters different from the first set of one or more parameters, the second set of one or more parameters associated with a second capability of the first UE to prioritize reception of downlink messages scheduled via the first type of scheduling over SRS-RSRP CLI measurements.

In some examples of the method, apparatuses, and non-transitory computer-readable medium described herein, transmitting the capability signaling may include operations, features, means, or instructions for transmitting an indication of a first priority configuration associated with a first downlink channel, a first type of downlink message, or both, the first priority configuration associated with a first relative priority between reception of downlink messages scheduled via the first type of scheduling and CLI measurements and transmitting an indication of a second priority configuration associated with a second downlink channel, a second type of downlink message, or both, the second priority configuration associated with a second relative priority between reception of downlink messages scheduled via the first type of scheduling and CLI measurements, where the first UE receives the downlink message in accordance with the first priority configuration or the second priority configuration.

In some examples of the method, apparatuses, and non-transitory computer-readable medium described herein, the first type of scheduling includes semi-static scheduling, semi-persistent scheduling (SPS), or both, and a second type of scheduling different from the first type of scheduling includes dynamic scheduling.

Some examples of the method, apparatuses, and non-transitory computer-readable medium described herein may further include operations, features, means, or instructions for identifying a Fast Fourier transform (FFT) window for receiving the downlink message based on transmitting the capability signaling, receiving the control signaling, or both, where the downlink message may be received based on the identified FFT window.

Some examples of the method, apparatuses, and non-transitory computer-readable medium described herein may further include operations, features, means, or instructions for receiving, from the base station, a control message indicating an activation of the first set of resources, where receiving the downlink message may be based on receiving the control message.

In some examples of the method, apparatuses, and non-transitory computer-readable medium described herein, the indication of the capability of the first UE to prioritize reception of downlink messages which at least partially overlap with resources used to perform CLI measurements further includes an indication of a second capability of the UE to support one or more pre-defined offset values, and each pre-defined offset value of the one or more pre-defined offset values includes a quantity of symbols following reception of the downlink message during which the first UE may be unable to perform CLI measurements.

A method for wireless communication at a base station is described. The method may include receiving, from a first UE, capability signaling including an indication of a capability of the first UE to prioritize reception of downlink messages scheduled via a first type of scheduling which at least partially overlap with resources used to perform CLI measurements, transmitting, to the first UE, control signaling indicating a first set of resources for a downlink message from the base station to the first UE, transmitting, to the first UE, additional control signaling indicating a second set of resources usable by the first UE to perform CLI measurements on signals transmitted by a second UE, where the second set of resources at least partially overlap with the first set of resources in a time domain, and transmitting the downlink message to the first UE within the first set of resources based on the indication of the capability.

An apparatus for wireless communication at a base station is described. The apparatus may include a processor, memory coupled with the processor, and instructions stored in the memory. The instructions may be executable by the processor to cause the apparatus to receive, from a first UE, capability signaling including an indication of a capability of the first UE to prioritize reception of downlink messages scheduled via a first type of scheduling which at least partially overlap with resources used to perform CLI measurements, transmit, to the first UE, control signaling indicating a first set of resources for a downlink message from the base station to the first UE, transmit, to the first UE, additional control signaling indicating a second set of resources usable by the first UE to perform CLI measurements on signals transmitted by a second UE, where the second set of resources at least partially overlap with the first set of resources in a time domain, and transmit the downlink message to the first UE within the first set of resources based on the indication of the capability.

Another apparatus for wireless communication at a base station is described. The apparatus may include means for receiving, from a first UE, capability signaling including an indication of a capability of the first UE to prioritize reception of downlink messages scheduled via a first type of scheduling which at least partially overlap with resources used to perform CLI measurements, means for transmitting, to the first UE, control signaling indicating a first set of resources for a downlink message from the base station to the first UE, means for transmitting, to the first UE, additional control signaling indicating a second set of resources usable by the first UE to perform CLI measurements on signals transmitted by a second UE, where the second set of resources at least partially overlap with the first set of resources in a time domain, and means for transmitting the downlink message to the first UE within the first set of resources based on the indication of the capability.

A non-transitory computer-readable medium storing code for wireless communication at a base station is described. The code may include instructions executable by a processor to receive, from a first UE, capability signaling including an indication of a capability of the first UE to prioritize reception of downlink messages scheduled via a first type of scheduling which at least partially overlap with resources used to perform CLI measurements, transmit, to the first UE, control signaling indicating a first set of resources for a downlink message from the base station to the first UE, transmit, to the first UE, additional control signaling indicating a second set of resources usable by the first UE to perform CLI measurements on signals transmitted by a second UE, where the second set of resources at least partially overlap with the first set of resources in a time domain, and transmit the downlink message to the first UE within the first set of resources based on the indication of the capability.

In some examples of the method, apparatuses, and non-transitory computer-readable medium described herein, receiving the capability signaling may include operations, features, means, or instructions for receiving an indication of one or more offset values, where each offset value of the one or more offset values includes a quantity of symbols following reception of the downlink message from the base station during which the first UE may be unable to perform CLI measurements.

In some examples of the method, apparatuses, and non-transitory computer-readable medium described herein, receiving the capability signaling may include operations, features, means, or instructions for receiving an indication of a first set of one or more characteristics associated with a first offset value and receiving an indication of a second set of one or more characteristics associated with a second offset value, where the first set of one or more characteristics, the second set of one or more characteristics, or both, includes an SCS, a frequency range, a type of CLI measurement, or any combination thereof.

In some examples of the method, apparatuses, and non-transitory computer-readable medium described herein, receiving the capability signaling may include operations, features, means, or instructions for receiving an indication of a first priority configuration associated with a first relative priority between reception of downlink messages scheduled via the first type of scheduling and CLI-RSSI measurements and receiving an indication of a second priority configuration associated with a second relative priority between reception of downlink messages scheduled via the first type of scheduling and SRS-RSRP CLI measurements, where the base station transmits the downlink message in accordance with the first priority configuration or the second priority configuration.

In some examples of the method, apparatuses, and non-transitory computer-readable medium described herein, receiving the capability signaling may include operations, features, means, or instructions for receiving an indication of a first set of one or more parameters associated with the first priority configuration, the first set of one or more parameters associated with a first capability of the first UE to prioritize reception of downlink messages scheduled via the first type of scheduling over CLI-RSSI measurements and receiving an indication of a second set of one or more parameters associated with the second priority configuration, the second set of one or more parameters different from the first set of one or more parameters, the second set of one or more parameters associated with a second capability of the first UE to prioritize reception of downlink messages scheduled via the first type of scheduling over SRS-RSRP CLI measurements.

In some examples of the method, apparatuses, and non-transitory computer-readable medium described herein, receiving the capability signaling may include operations, features, means, or instructions for receiving an indication of a first priority configuration associated with a first downlink channel, a first type of downlink message, or both, the first priority configuration associated with a first relative priority between reception of downlink messages scheduled via the first type of scheduling and CLI measurements and receiving an indication of a second priority configuration associated with a second downlink channel, a second type of downlink message, or both, the second priority configuration associated with a second relative priority between reception of downlink messages scheduled via the first type of scheduling and CLI measurements, where the base station transmits the downlink message in accordance with the first priority configuration or the second priority configuration.

In some examples of the method, apparatuses, and non-transitory computer-readable medium described herein, the first type of scheduling includes semi-static scheduling, SPS, or both, and a second type of scheduling different from the first type of scheduling includes dynamic scheduling.

Some examples of the method, apparatuses, and non-transitory computer-readable medium described herein may further include operations, features, means, or instructions for transmitting, to the first UE, a control message indicating an activation of the first set of resources, where transmitting the downlink message may be based on transmitting the control message.

DETAILED DESCRIPTION

Figure 1:
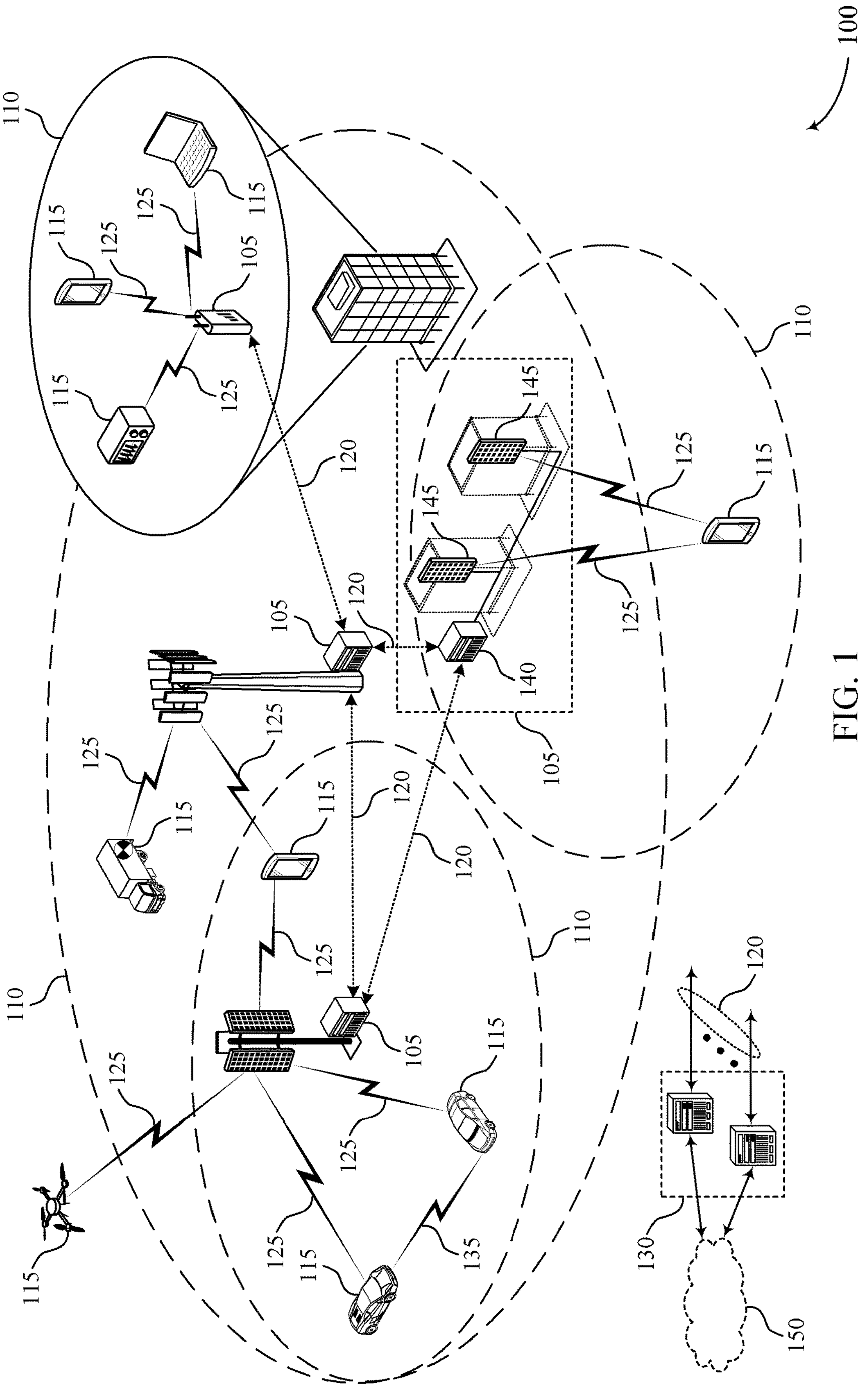
FIG. 1 illustrates an example of a wireless communications system that supports techniques for cross-link interference (CLI) measurement prioritization in accordance with aspects of the present disclosure.

A user equipment (UE) may experience cross-link interference (CLI) attributable to signals transmitted by other UEs. For example, a "victim" UE may experience CLI from signals transmitted by an "aggressor" UE in cases where downlink resources of the victim UE overlap with uplink resources of the aggressor UE, thereby resulting in CLI. In some wireless communications systems, UEs may be configured to perform CLI measurements on signals received from other UEs, and report measured CLI to the network so that the network may adjust resources allocated to the respective UEs to reduce CLI. In such cases, the network may allocate CLI measurement resources semi-statically (e.g., in advance) so that a UE may perform CLI measurements within the allocated resources.

However, some UEs may be unable to simultaneously perform CLI measurements and receive downlink messages (e.g., physical downlink shared channel (PDSCH) messages) from the network. Thus, a conflict arises when downlink messages are scheduled in resources which overlap with CLI measurement resources. In cases where downlink messages are dynamically scheduled (e.g., via downlink control information (DCI) messages) in resources which overlap with CLI measurement resources, UEs may be configured to prioritize the CLI measurements, and may therefore refrain from receiving the scheduled downlink message.

Accordingly, aspects of the present disclosure support techniques which enable a UE to prioritize reception of semi-statically and/or semi-persistently scheduled downlink messages over semi-statically and/or semi-persistently scheduled CLI measurements. For example, a UE may receive control signaling (e.g., radio resource control (RRC) signaling) which schedules CLI measurement resources and a downlink message which at least partially overlaps with the CLI measurement resources. In this example, the UE may transmit capability signaling to the network indicating that the UE is able to prioritize reception of the semi-statically scheduled downlink message which overlaps with CLI measurement resources. In this example, the network may transmit the downlink message based on the UE capability, and the UE may subsequently receive the semi-statically scheduled downlink message (and refrain from performing the conflicting CLI measurements).

In some cases, the UE may report different prioritization capabilities based on a type of downlink channel, a type of downlink message, a type of CLI measurement, as a function of subcarrier spacing (SCS), or any combination thereof. In this regard, the UE may report multiple prioritization capabilities. The UE may additionally report one or more offset values (e.g., N values), which indicate a quantity of symbols following reception of a downlink message during which the UE is unable to perform CLI measurements. By reporting offset values, the UE may not be expected to perform CLI measurements for some quantity of symbols after a downlink message, thereby reducing processing complexity.

Aspects of the disclosure are initially described in the context of wireless communications systems. Additional aspects of the disclosure are described in the context of an example resource configuration and an example process flow. Aspects of the disclosure are further illustrated by and described with reference to apparatus diagrams, system diagrams, and flowcharts that relate to techniques for CLI measurement prioritization.

FIG. 1 illustrates an example of a wireless communications system 100 that supports techniques for CLI measurement prioritization in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As noted previously herein, some UEs 115 may be unable to simultaneously perform CLI measurements and receive downlink messages (e.g., PDSCH messages) from the network. Thus, a conflict arises when downlink messages are scheduled in resources which overlap with CLI measurement resources. In cases where downlink messages are dynamically scheduled (e.g., DCI messages) in resources which overlap with CLI measurement resources, UEs 115 may be configured to prioritize the CLI measurements, and may therefore refrain from receiving the scheduled downlink message.

Accordingly, the UEs 115 and the base stations 105 of the wireless communications system 100 may support techniques and signaling which enable a UE 115 to prioritize reception of semi-statically and/or semi-persistently scheduled downlink messages over semi-statically and/or semi-persistently scheduled CLI measurements. For example, a UE 115 of the wireless communications system 100 may receive, from a base station 105, control signaling (e.g., RRC signaling) which schedules CLI measurement resources and a downlink message which at least partially overlaps with the CLI measurement resources. In this example, the UE 115 may transmit capability signaling to the network indicating that the UE 115 is able to prioritize reception of the semi-statically scheduled downlink message which overlaps with CLI measurement resources. In this example, the network (e.g., base station 105) may transmit the downlink message based on the UE capability, and the UE 115 may subsequently receive the semi-statically scheduled downlink message (and refrain from performing the conflicting CLI measurements).

In some cases, the UE 115 may report different prioritization capabilities based on a type of downlink channel, a type of downlink message, a type of CLI measurement, as a function of SCS, or any combination thereof. In this regard, the UE 115 may report multiple prioritization capabilities. The UE 115 may additionally report one or more offset values (e.g., N values), which indicate a quantity of symbols following reception of a downlink message during which the UE 115 is unable to perform CLI measurements. By reporting offset values, the UE 115 may not be expected to perform CLI measurements for the specified quantity of symbols after a downlink message, thereby reducing processing complexity.

Techniques described herein may enable UEs 115 to prioritize reception of downlink messages from the network over CLI measurements. As such, techniques described herein may lead to improved resource utilization within the wireless communications system 100, and reduce a latency of communications between the UE 115 and the network. Moreover, techniques described herein may enable more flexible and tailored solutions for CLI measurement by victim UEs 115.

Figure 2:
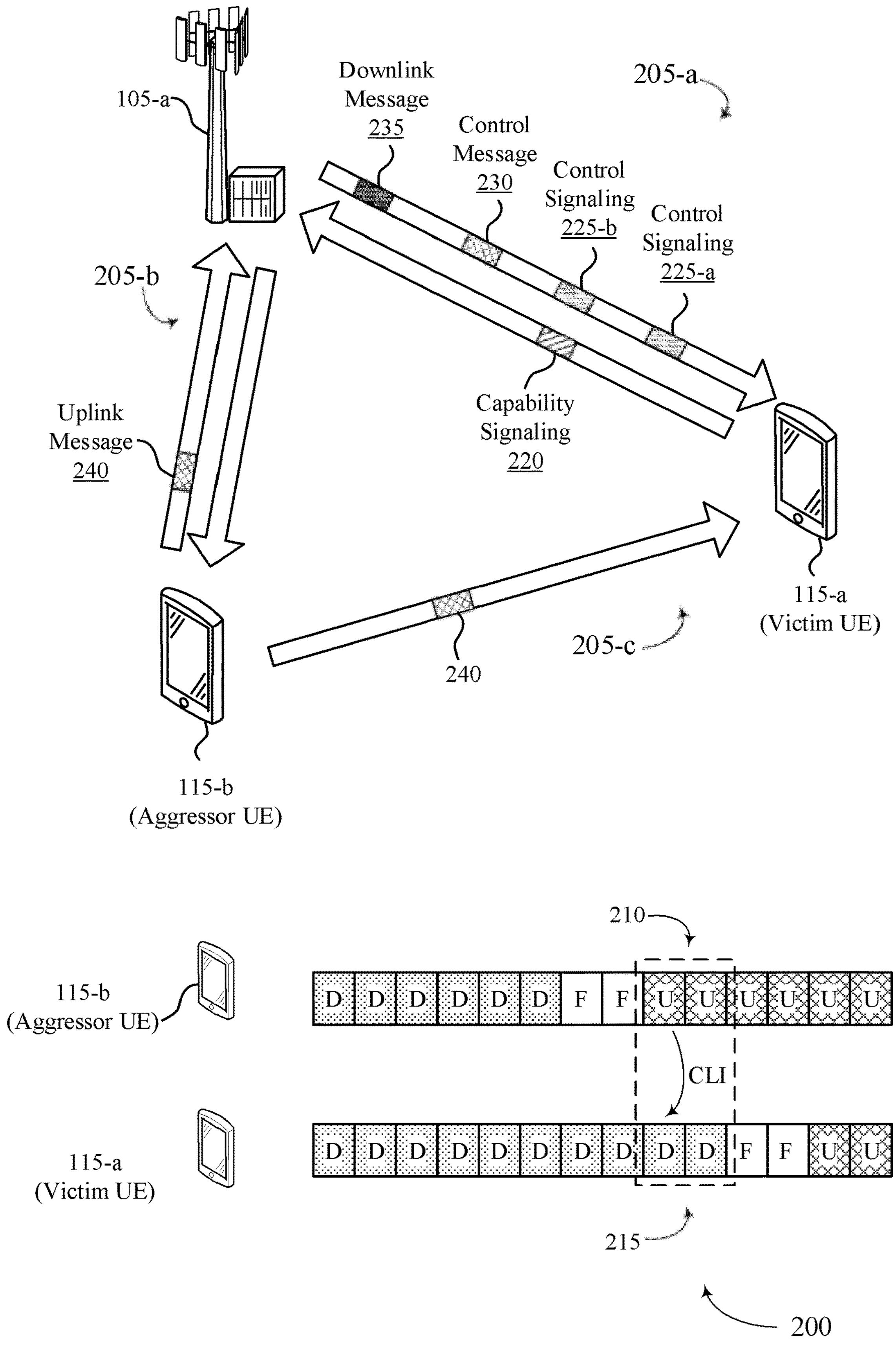
FIG. 2 illustrates an example of a wireless communications system that supports techniques for CLI measurement prioritization in accordance with aspects of the present disclosure.

FIG. 2 illustrates an example of a wireless communications system 200 that supports techniques for CLI measurement prioritization in accordance with aspects of the present disclosure. In some examples, wireless communications system 200 may implement, or may be implemented by, aspects of wireless communications system 100. The wireless communications system 200 may include a first UE 115-*a*, a second UE 115-*b*, and a base station 105-*a*, which may be examples of UEs 115 and base stations 105, as described with reference to FIG. 1. In particular, the first UE 115-*a* may be an example of a victim UE 115-*a*, and the second UE 115-*b* may be an example of an aggressor UE 115-*b*, as described previously herein.

The first UE 115-*a* and the second UE 115-*b* may communicate with the base station 105-*a* using a communication link 205-*a* and a communication link 205-*b*, respectively, which may be examples of NR or LTE links between the first UE 115-*a* and the second UE 115-*b*, respectively, and the base station 105-*a*. In some cases, the communication link 205-*a* and the communication link 205-*b* may include examples of access links (e.g., Uu links). The communication link 205-*a* and communication link 205-*b* may include bi-directional links that enable both uplink and downlink communication. For example, the first UE 115-*a* may transmit uplink signals, such as uplink control signals or uplink data signals, to the base station 105-*a* using the first communication link 205-*a* and the base station 105-*a* may transmit downlink signals, such as downlink control signals or downlink data signals, to the first UE 115-*a* using the communication link 205-*a*. By way of another example, the second UE 115-*b* may transmit uplink signals, such as uplink control signals or uplink data signals, to the base station 105-*a* using the first communication link 205-*b* and the base station 105 may transmit downlink signals, such as downlink control signals or downlink data signals, to the second UE 115-*b* using the communication link 205-*b*. The first UE 115-*a* and the second UE 115-*b* may communicate with one another via a communication link 205-*c*. In some cases, the communication link 205-*c* may include an example of a link between two UEs 115 (e.g., a sidelink communication link, or PC5 link).

As noted previously herein, a victim UE 115 (e.g., first UE 115-*a*) may experience CLI which is attributable to signals transmitted by another nearby aggressor UE 115 (e.g., second UE 115-*b*). CLI may occur when the network (e.g., base station 105-*a*) configures multiple nearby UEs 115 with different TDD uplink and downlink slot formats. In particular, when an aggressor UE 115 (e.g., second UE 115-*b*) is transmitting uplink signals, a nearby victim UE 115 (e.g., first UE 115-*a*) may receive the uplink signals as CLI within its configured downlink symbols if uplink symbols of the aggressor UE 115 collide with (e.g., overlap with) at least one downlink symbol of the victim UE 115. The uplink signals transmitted by the aggressor UE 115-*b* may or may not be intended for the victim UE 115-*a*, such that the victim UE 115-*a* inadvertently "intercepts" the uplink signals intended for another wireless device (e.g., base station 105-*a*).

For example, as shown in FIG. 2, the first UE 115-*a* (e.g., victim UE 115-*a*) may experience CLI from signals transmitted by the second UE 115-*b* (e.g., aggressor UE 115-*b*) in cases where downlink resources 215 of the first UE 115-*a* overlap with uplink resources 210 of the second UE 115-*b*. In such cases, uplink transmissions from second UE 115-*b* over the uplink resources 210 may collide with, or otherwise interrupt or interfere with, downlink transmissions received by the first UE 115-*a* within the downlink resources 215, thereby resulting in CLI. CLI may occur between UEs 115 within the same cell and/or between UEs 115 within different cells.

Some wireless communications systems (e.g., wireless communications system 200) have defined signaling and procedures for the victim UE 115-*a* to measure CLI which is attributable to signals transmitted by the aggressor UE 115-*b*. In this regard, the victim UE 115-*b* may be configured to perform CLI measurements attributable to signals received from other UEs 115 (e.g., aggressor UE 115-*b*). In such cases, the signals transmitted by the aggressor UE 115-*b* my not include information which is dedicated for CLI measurement by the victim UE 115-*a*. Moreover, the aggressor UE 115-*b* may not know that its uplink signals transmitted within the uplink resources 210 are measured by the victim UE 115-*a*.

CLI measurements performed by the victim UE 115-*a* may include Layer 3 (L3) measurements. For example, CLI measurements may include CLI-received signal strength indicator (RSSI) measurements, SRS-reference signal received power (RSRP) CLI measurements, and the like. As such, CLI measurements may be defined as periodic measurements based on SRS RSRP or RSSI.

In some implementations, the victim UE 115-*a* may be configured to perform CLI measurements on signals received from other UEs 115 (e.g., aggressor UE 115-*b*), and report measured CLI to the network (e.g., base station 105-*a*) so that the network may adjust resources allocated to the respective victim UE 115-*a* and aggressor UE 115-*b* to reduce or eliminate CLI experienced at the victim UE 115-*a*. In other words, the base station 105-*a* can manage the scheduling of aggressor and victim UEs 115 to balance the throughput of different UEs 115 based on the CLI measurement report transmitted by the victim UE 115-*a*. In some cases, the victim UE 115-*a* may measure CLI if the network configures one or more CLI measurement resources to the victim UE 115-*a*.

Some UEs 115 may be unable to simultaneously perform CLI measurements and receive downlink messages (e.g., PDSCH messages) from the network. In particular, the timing of CLI measurement resources and the timing of serving cell downlink signals may be different, which makes it difficult (or impossible) for some UEs 115 to perform simultaneous downlink message reception and CLI measurement. For example, consider a special case in which the two serving cells for the aggressor UE 115-*b* and the victim UE 115-*a* have the same cell radius, and the two UEs 115 are close to one another. In this example, the optimal reception (Rx) timing of the CLI resource for the victim UE 115-*a* may be approximately equal to the uplink timing of the victim UE 115-*a*, which is different than the optimal Rx timing of the serving cell downlink channel/signal of the victim UE 115-*a* by the amount of the UL Timing Advance of the victim UE 115-*a*.

As such, separate Fast Fourier transform (FFT) window timing may be required for the victim UE 115-*a* to perform CLI measurements within allocated CLI resources and to receive downlink signals from the serving cell (e.g., first FFT window for CLI measurement, second FFT window for downlink message reception). If the allocated CLI resource and the serving cell downlink message channel are configured in the same symbol, the victim UE 115-*a* may be required use two FFT windows in the symbol.

However, as noted previously herein, the use of two FFT windows within the same symbol is not supported by some UEs 115. In other words, some UEs 115 do not support simultaneous reception of downlink signals/channels and CLI-RSSI measurements, or simultaneous reception of downlink signals/channels and SRS-RSRP CLI measurements. For example, in cases where a victim UE 115 which does not support simultaneous reception of downlink signals/channels and SRS-RSRP CLI measurements/CLI-RSSI measurements, the victim UE 115-*a* is not expected to receive a downlink message (e.g., physical downlink control channel (PDCCH) message, PDSCH message, CSI-RS for tracking, CSI-RS for channel quality indicator (CQI)) on OFDM symbols on which the victim UE 115 performs SRS-RSRP CLI measurements and/or CLI-RSSI measurements. Moreover, according to these techniques, the victim UE 115 may not be expected to receive downlink messages on a N quantity of data symbol(s) before an OFDM symbol used for SRS-RSRP CLI measurements and/or CLI-RSSI measurements. The value of N may be determined by the SCS of the serving cell, and may be reserved to account for the maximum timing difference between the CLI measurement resource and the serving cell downlink channel/symbol.

Thus, a conflict arises when downlink messages are scheduled in resources which overlap with CLI measurement resources. In some wireless communications systems, when CLI measurement resources and the serving cell downlink channel/signal collide in the same symbol, a conventional victim UE 115 may be configured to prioritize CLI measurement (e.g., prioritize CLI-RSSI measurements and/or SRS-RSRP CLI measurements).

The rationale behind this prioritization rule is that CLI measurement resources are generally semi-statically configured via a higher layer (e.g., L3), whereas downlink messages from the serving cell may be dynamically triggered/scheduled. As such, the victim UE 115-*a* generally knows of configured CLI measurement resources in advance, prior to resources reserved for dynamically scheduled downlink messages. Thus, this prioritization rule implemented by some wireless communications systems always results in semi-static determination of the FFT window timing, even when downlink messages are dynamically scheduled/triggered, which reduces processing complexity at the victim UE 115-*a*, resulting in preferred UE 115 implementation. Conversely, if this prioritization rule did not exist and the dynamically triggered/scheduled downlink message were to be prioritized, the victim UE 115-*a* may be required to dynamically switch between two FFT windows within a symbol where CLI measurement resources collide with the resources for the dynamically scheduled downlink message. This would result in increased processing complexity at the victim UE 115-*a*, and may not be able to be performed by some UEs 115.

Although this prioritization rule which prioritizes semi-statically configured CLI measurements over reception of dynamically-scheduled downlink messages may result in a preferable implementation at the victim UE 115-*a*, such a prioritization rule unnecessarily de-prioritizes serving cell downlink messages which are not dynamically scheduled/triggered, such higher layer periodic or semi-persistent scheduling (SPS) channels/signals (e.g., semi-statically scheduled downlink messages, SPS downlink messages).

Accordingly, aspects of the present disclosure support additional and/or alternative prioritization rules which enable the victim UE 115-*a* to prioritize reception of semi-statically and/or semi-persistently scheduled downlink messages over semi-statically and/or semi-persistently scheduled CLI measurements. Such techniques may provide improved flexibility at the victim UE 115-*a*, may lead to a more efficient use of downlink resources, and may reduce a latency of communications between the victim UE 115-*a* and the base station 105-*a*.

For example, the first UE 115-*a* may transmit capability signaling 220 (e.g., UE capability message) to the base station 105-*a*. The capability signaling 220 may include an indication of a capability of the first UE 115-*a* to prioritize reception of downlink messages 235 which are scheduled via a first type of scheduling which at least partially overlap with resources used to perform CLI measurements. The first type of scheduling may include semi-static scheduling, SPS, or both. In this regard, the first UE 115-*a* may indicate that it is capable of prioritizing the serving cell downlink channel/signal (e.g., prioritize a scheduled downlink message 235) that is not dynamically scheduled/triggered over configured CLI measurement resources. Downlink messages 235 which may be prioritized over configured CLI measurement resources may include PDCCH messages, SPS PDSCH messages, periodic CSI-RS, SPS CSI-RS, or any combination thereof.

In other words, for serving cell downlink messages that are not dynamically scheduled/triggered, the first UE 115-*a* may always semi-statically determine the FFT window timing for the scheduled downlink message 235, no matter whether CLI resource or the serving cell downlink message 235 is prioritized. As such, according to techniques described herein, there is no need to always prioritize CLI measurement over these serving cell downlink channel/signal, but rather, the first UE 115-*a* may be able to semi-statically determine FFT windows for CLI measurements and scheduled downlink messages 235 in order to determine which should be prioritized.

In some implementations, the capability signaling 220 may indicate the capability of the first UE 115-*a* to prioritize reception of non-dynamically scheduled downlink messages 235 (e.g., downlink messages 235 scheduled via semi-static scheduling and/or SPS) over CLI measurement resources by indicating one or more priority configurations. Each priority configuration may define a set of rules or parameters for prioritizing scheduled downlink messages 235 over conflicting resources used for CLI measurements. In some cases, the first UE 115-*a* may support different capabilities for prioritizing downlink messages 235 over conflicting CLI measurement resources based on the type of downlink message 235, the type of downlink channel or signal, the type of CLI measurement resource, or any combination thereof. As such, the capability signaling 220 may indicate one or more supported priority configurations depending on the type of downlink channel/message and/or type of CLI measurement resources.

For example, in some cases, the capability signaling 220 may include an indication of a first priority configuration associated with CLI-RSSI measurements, and a second priority configuration associated with SRS RSRP CLI measurements. In this example, the first priority configuration may define a first relative priority between reception of downlink messages 235 scheduled via the first type of scheduling and CLI-RSSI measurements, whereas the second priority configuration may define a second relative priority between reception of downlink messages 235 scheduled via the first type of scheduling and SRS-RSRP CLI measurements. For instance, the capability signaling 220 may further indicate a first set of parameters associated with the first priority configuration, and a second set of parameters associated with the second priority configuration. The first set of one or more parameters may be associated with a first capability of the first UE 115-*a* to prioritize reception of downlink messages 235 scheduled via the first type of scheduling over CLI-RSSI measurements, whereas the second set of one or more parameters are associated with a second capability of the first UE 115-*a* to prioritize reception of downlink messages 235 scheduled via the first type of scheduling over SRS-RSRP CLI measurements.

In this regard, the first and second priority configurations may each define different sets of rules or parameters for prioritizing downlink messages 235 over the respective types of CLI measurements. In other words, in some cases, separate prioritization capabilities may be defined for CLI-RSSI measurements and SRS-RSRP CLI measurements.

In other cases, the capability signaling 220 may indicate a capability of the UE 115-*a* to prioritize downlink messages 235 over CLI measurements based on characteristics of the downlink channel and/or downlink message 235. In this regard, separate and/or joint capabilities for prioritizing downlink messages 235 over CLI measurements may be defined for each of the serving cell downlink channels and/or downlink signals.

For example, in some cases, the capability signaling 220 may indicate a first priority configuration associated with a first downlink channel and a second priority configuration associated with a second downlink channel. In this example, the first priority configuration may be associated with a first relative priority between downlink messages 235 scheduled over the first downlink channel and CLI measurements, and the second priority configuration may be associated with a second relative priority between downlink messages 235 scheduled over the second downlink channel and CLI measurements.

Similarly, by way of another example, the capability signaling 220 may indicate a first priority configuration associated with a first type of downlink message 235 and a second priority configuration associated with a second type of downlink message 235. In this example, the first priority configuration may be associated with a first relative priority between the first type of message and CLI measurements, and the second priority configuration may be associated with a second relative priority between the second type of downlink message 235 and CLI measurements.

In some implementations, the control signaling 225 may indicate one or more offset values (N values) which indicate a minimum offset between reception of a scheduled downlink message 235 and CLI measurement resources which are useable by the UE 115-*a*. In other words, each offset value (e.g., each N value) may define a quantity of symbols (or some other time duration) following reception of a scheduled downlink message 235 during which the first UE 115-*a* is unable to perform CLI measurements. For example, in cases where the UE 115-*a* reports an offset value of two symbols (e.g., N=2), the first UE 115-*a* may be unable to perform CLI measurements for two symbols following reception of a downlink message 235. Stated differently, by reporting N=2, the first UE 115-*a* may not be expected to perform CLI measurements for at least two symbols following reception of a downlink message 235.

In some aspects, offset values (N values) may be reserved to account for the maximum timing difference between CLI measurement resources and the serving cell downlink channel and/or downlink signal. In some cases, offset values (N values) may be determined by the SCS of the serving cell. In other words, offset values may be defined as a function of SCS. For example, offset values may be defined as a function of SCS values, as shown in Table 1 below:

TABLE 1

Offset Values for CLI-RSSI Measurements and SRS-RSRP CLI Measurements

| | SRS-RSRP | | | | |
|---|---|---|---|---|---|
| CLI-RSSI | FR1 | | | FR2 | |
| SCS (kHz) | 15 | 30 | 60 | 60 | 120 |
| N | 1 | 1 | 2 | 1 | 2 |

As shown in Table 1 above, the value of offset values (N values) may be defined based on the SCS of the downlink carrier of interest. In some cases, the first UE 115-*c* may report an offset value (N value) for each applicable SCS. Moreover, as shown in Table 1, the first UE 115-*a* may separately report N values for different frequency ranges (e.g., Frequency Range 1 (FR1), Frequency Range 2 (FR2)), for different types of CLI measurements (e.g., CLI-RSSI measurements, SRS-RSRP CLI measurements), and the like.

As such, in some implementations, the capability signaling 220 may indicate different sets of characteristics associated with different offset values. For example, the capability signaling 220 may indicate a first set of characteristics associated with a first offset value ($N_1$) and a second set of characteristics associated with a second offset value ($N_2$), where the respective sets of characteristics include an applicable SCS, a frequency range, a type of CLI measurement, an applicable downlink channel, a type of downlink message 235, or any combination thereof.

In additional or alternative cases, the indication of the capability of the first UE 115-*a* to prioritize reception of downlink messages 235 scheduled via the first type of scheduling (e.g., semi-static scheduling, SPS) over conflicting CLI measurement resources may serve as an implicit indication that the UE 115-*a* supports a set of pre-defined offset values. For example, in some cases, the offset values defined in Table 1 may include a set of pre-defined offset values. In this example, by indicating that the first UE 115-*a* is able to prioritize reception of downlink messages 235 over CLI measurements, the first UE 115-*a* may implicitly indicate that it supports the pre-defined offset values defined in Table 1.

For example, in cases where the first UE 115-*a* does not support simultaneous reception of downlink signals/channels and SRS-RSRP CLI measurements, the first UE 115-*a* may not perform SRS-RSRP CLI measurements on OFDM symbols on which the first UE 115-*a* is configured with higher layer configured or SPS PDCCH/PDSCH/CSI-RS for tracking/CSI-RS for CQI on OFDM symbols, and on N OFDM symbol(s) after an OFDM symbol used for receiving these PDCCH/PDSCH/CSI-RS, where N is determined by the subcarrier spacing. Similarly, in cases where the first UE 115-*a* does not support simultaneous reception of downlink signals/channels and CLI-RSSI measurements, the first UE 115-*a* may not perform CLI-RSSI measurements on OFDM symbols on which the first UE 115-*a* is configured with higher layer configured or SPS PDCCH/PDSCH/CSI-RS for tracking/CSI-RS for CQI on OFDM symbols, and on N OFDM symbol(s) after an OFDM symbol used for receiving these PDCCH/PDSCH/CSI-RS, where N is determined by the subcarrier spacing.

In some aspects, the first UE 115-*a* may receive, from the base station 105-*a*, control signaling 225-*a* which indicates a first set of resources for a downlink message 235 from the base station 105-*a* to the first UE 115-*a*. In other words, the control signaling 225-*a* may schedule a downlink message 235 from the base station 105-*a* to the first UE 115-*a*. In some aspects, the control signaling 225-*a* may schedule the downlink message 235 via the first type of scheduling, which may include semi-static scheduling, SPS, or both. For example, in some implementations, the control signaling 225-*a* may include RRC signaling which schedules the downlink message 235.

The first UE 115-*a* may receive, from the base station 105-*a*, additional control signaling 225-*b* which indicates a second set of resources which are useable by the first UE 115-*a* to perform CLI measurements on signals transmitted by other UEs 115 (e.g., second UE 115-*b*). In some cases, the second set of resources useable by the first UE 115-*c* for performing CLI measurements may at least partially overlap with the first set of resources for the downlink message 235 scheduled via the control signaling 225-*a*. The first and second sets of resources may at least partially overlap in the time domain, the frequency domain, or both.

The control signaling 225-*a* and the additional control signaling 225-*b* are shown and described as separate control signaling 225. However, in some implementations, the control signaling 225-*a* and the additional control signaling 225-*b* may be indicated via the same control signaling 225 (e.g., single RRC message).

In some aspects, the second set of resources usable for CLI measurements may include resources across a set of CLI measurement instances, where the first UE 115-*a* is configured to perform one or more CLI measurements within each CLI measurement instance. For example, in some cases, RRC signaling (e.g., additional control signaling 225-*b*) may configure the first UE 115-*a* with a set of CLI measurement instances, where the CLI measurement instances are scheduled according to a regular or irregular periodicity. CLI measurement instances will be described in further detail herein with reference to FIG. 3.

In some implementations, the first UE 115-*a* may receive, from the base station 105-*a*, a control message 230 indicating an activation of the first set of resources associated with the downlink message 235 scheduled via the control signaling 225-*a*. In this regard, the control message 230 may “trigger” or “activate” the downlink message 235 which was scheduled via the control signaling 225-*a*. However, even in cases where the downlink message 235 is triggered/activated via the control message 230, the first UE 115-*a* may know the resources for the downlink message 235 in advance (e.g., prior to the control message 230 triggering/activating the downlink message 235). In this regard, the first UE 115-*a* may be able to semi-statically determine the FFT window timing for the downlink message 235. As such, the downlink message 235 may be scheduled via semi-static scheduling, SPS, or both. The downlink message 235 may include a DCI message, a MAC-CE, or both.

The first UE 115-*a* may identify an FFT window for receiving the downlink message 235. The first UE 115-*a* may identify the FFT window for receiving the downlink message 235 based on transmitting the capability signaling 220, receiving the control signaling 225-*a*, receiving the additional control signaling 225-*b*, receiving the control message 230, or any combination thereof. For example, in some cases, the first UE 115-*a* may identify the FFT window for the downlink message 235 based on identifying that the first set of resources for the downlink message 235 and the second set of resources for the CLI measurements at least partially overlap in the time domain. In this example, the first UE 115-*a* may further identify the FFT window for the downlink message 235 based on the first UE 115-*a* indicating (via the capability signaling 220) that it may prioritize reception of downlink messages 235 over CLI measurements.

In some cases, the first UE 115-*a* may refrain from performing CLI measurements. In particular, the first UE 115-*a* may refrain from performing CLI measurements so that the first UE 115-*a* may receive the downlink message 235 scheduled via the control signaling 225-*a*. In this regard, the first UE 115-*a* may refrain from performing CLI measurements based on the first set of resources for the downlink message 235 overlapping with the second set of resources for CLI measurements. The first UE 115-*a* may refrain from performing the CLI measurements based on transmitting the capability signaling 220, receiving the control signaling 225-*a*, receiving the additional control signaling 225-*b*, receiving the control message 230, identifying the FFT window for the downlink message 235, or any combination thereof.

For example, as noted previously herein, the second set of resources for CLI measurements may include a set of CLI measurement instances. In this example, the first set of resources for the downlink message 235 may overlap with a first CLI measurement instance of the second set of resources. As such, the first UE 115-*a* may refrain from performing CLI measurements within the first CLI measurement instance so that the first UE 115-*a* may instead receive the scheduled downlink message 235.

In some aspects, the first UE 115-*a* may receive the downlink message 235 from the base station 105-*a*. In particular, the first UE 115-*a* may receive the downlink message 235 within the first set of resources allocated for the downlink message 235 via the control signaling 225-*a*. The downlink message 235 may include a PDCCH message, a PDSCH message (e.g., SPS PDSCH message), a CSI-RS (e.g., periodic SPS CSI-RS, an aperiodic SPS CSI-RS), or any combination thereof.

The first UE 115-*a* may receive the downlink message 235 based on (e.g., within, using) the identified FFT window. Conversely, the base station 105-*a* may transmit the downlink message 235 based on receiving (via the capability signaling 220) the indication that the first UE 115-*a* is capable of prioritizing downlink messages 235 over CLI measurements. Additionally, or alternatively, the first UE 115-*a* may receive the downlink message 235 based on transmitting the capability signaling 220, receiving the control signaling 225-*a*, receiving the additional control signaling 225-*b*, receiving the control message 230, refraining from performing the CLI measurements, or any combination thereof.

For example, the first UE 115-*a* may receive the downlink message 235 in accordance with one or more priority configurations indicated via the capability signaling 220. For instance, as noted previously herein, the first UE 115-*a* may support one or more priority configurations which define different rules/parameters for relative priorities between downlink messages 235 and conflicting CLI measurements. Each of the priority configurations may be associated with different sets of characteristics/parameters, including a type of downlink message 235, a downlink channel, type of CLI measurement, and the like. In this example, the first UE 115-*a* may support a priority configuration for prioritizing PDCCH messages over conflicting CLI-RSSI measurements. As such, in cases where the downlink message 235 includes a PDCCH message and the second set of resources are allocated for CLI-RSSI measurements, the first UE 115-*a* may receive the downlink message 235 (e.g., PDCCH message) at 435 in accordance with the priority configuration.

In some implementations, the second UE 115-*b* may transmit an uplink message 240 to the base station 105-*a*. The uplink message 240 may include a physical uplink control channel (PUCCH) message, a physical uplink shared channel (PUSCH) message, an SRS, or any combination thereof. As noted previously herein, the uplink message 240 may not be intended for the first UE 115-*a*, but may be intercepted, or otherwise received, by the first UE 115-*a*, which may result in CLI at the first UE 115-*a*. The first UE 115-*a* may perform CLI measurements on the uplink message 240 transmitted by the second UE 115-*b*. In some cases, the first UE 115-*a* may receive the uplink message 240 and perform the CLI measurements within a CLI measurement instance for performing CLI measurements at the first UE 115-*a*.

For example, as noted previously herein, the second set of resources for CLI measurements may include a set of CLI measurement instances. In this example, the first set of resources for the downlink message 235 may overlap with a first CLI measurement instance of the second set of resources. As such, the first UE 115-*a* may refrain from performing CLI measurements within the first CLI measurement instance so that the first UE 115-*a* may instead receive the scheduled downlink message 235. Continuing with the same example, the first UE 115-*a* may subsequently receive the uplink message 240 from the second UE 115-*b* within a second CLI measurement instance which is subsequent to the first CLI measurement instance. In this regard, the first UE 115-*a* may perform CLI measurements on the uplink message 240 received within the second CLI measurement instance.

Techniques described herein may enable the first UE 115-*a* to prioritize reception of downlink messages 235 from the network over CLI measurements. As such, techniques described herein may lead to improved resource utilization within the wireless communications system, and reduce a latency of communications between the first UE 115-*a* and the network. Moreover, techniques described herein may enable more flexible and tailored solutions for CLI measurement by victim UEs 115.

Figure 3:
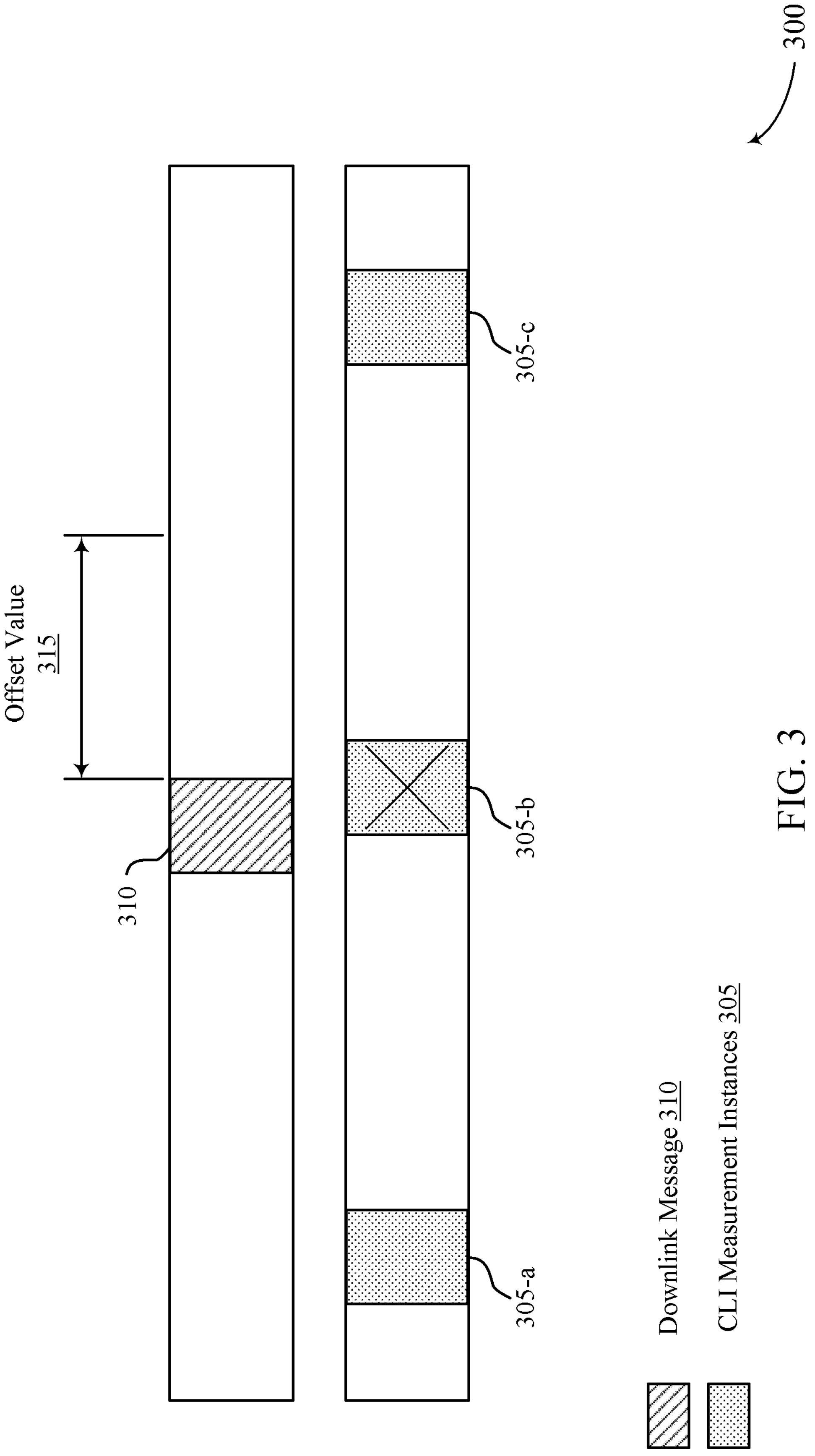
FIG. 3 illustrates an example of a resource configuration that supports techniques for CLI measurement prioritization in accordance with aspects of the present disclosure.

FIG. 3 illustrates an example of a resource configuration 300 that supports techniques for CLI measurement prioritization in accordance with aspects of the present disclosure. In some examples, resource configuration 300 may implement, or be implemented by, aspects of wireless communications system 100, wireless communications system 200, or both.

As shown in resource configuration 300, a UE 115 may be configured with a second set of resources used for CLI measurements. The second set of resources may include a set of CLI measurement instances 305, where the UE 115 is configured to perform one or more CLI measurements within each of the respective CLI measurement instances. For example, as shown in the resource configuration 300, a UE 115 may be configured with a first CLI measurement instance 305-*a*, a second CLI measurement instance 305-*b*, and a third CLI measurement instance 305-*c*. The CLI measurement instances 305 may be configured according to a regular periodicity, an irregular periodicity, or both. Moreover, in some cases, the network (e.g., base station 105) may configure the UE 115 with resources for CLI measurements (e.g., CLI measurement instances 305) based on CLI measurement reports received from the UE 115.

The UE 115 may additionally receive control signaling which schedules a downlink message 310 from the network to the UE 115. The set of resources allocated for the scheduled downlink message 310 may at least partially overlap with the set of resources used for CLI measurements at the UE 115. For example, as shown in FIG. 3, the set of resources allocated for the downlink message 310 may at least partially overlap with the second CLI measurement instance 305-*b* in the time domain.

In some implementations, as described previously herein, the UE 115 may support a capability to prioritize reception of downlink messages 310 scheduled via semi-static scheduling and/or SPS over conflicting CLI measurement resources. For example, the UE 115 may be configured to perform one or more CLI measurements in the first CLI measurement instance 305-*a*. Subsequently, the first UE 115 may be configured to refrain from performing CLI measurements within the second CLI measurement instance 305-*b* based on the UE capability and the second CLI measurement instance 305-*b* conflicting with the scheduled downlink message 310 in the time domain. Moreover, by refraining from performing CLI measurements within the second CLI measurement instance 305-*b*, the UE 115 may be able to prioritize reception of the downlink message 310.

In some cases, the UE 115 may be unable to perform CLI measurements within a quantity of symbols following reception of the downlink message 310. The quantity of symbols may be defined by an offset value 315 (e.g., N value). Capability signaling transmitted by the UE 115 to the network may indicate one or more offset values 315 (N values) which indicate a minimum offset between reception of the scheduled downlink message 310 and CLI measurement resources which are useable by the UE 115. In other words, each offset value 315 (e.g., each N value) may define a quantity of symbols (or some other time duration) following reception of a scheduled downlink message 310 during which the UE 115 is unable to perform CLI measurements. For example, in cases where the UE 115 reports an offset value 315 of two symbols (e.g., N=2), the UE 115 may be unable to perform CLI measurements for two symbols following reception of the downlink message 310. Stated differently, by reporting N=2, the UE 115 may not be expected to perform CLI measurements for at least two symbols following reception of the downlink message 310.

In some aspects, the offset value 315 (N value) may be reserved to account for the maximum timing difference between CLI measurement resources and the serving cell downlink channel and/or downlink signal. In some cases, offset values 315 (N values) may be determined by the SCS of the serving cell. In other words, offset values 315 may be defined as a function of SCS. For example, offset values may be defined according to Table 1 above. Continuing with reference to FIG. 3, the UE 115 may be configured to perform one or more CLI measurements within the third CLI measurement instance 305-*c*.

Figure 4:
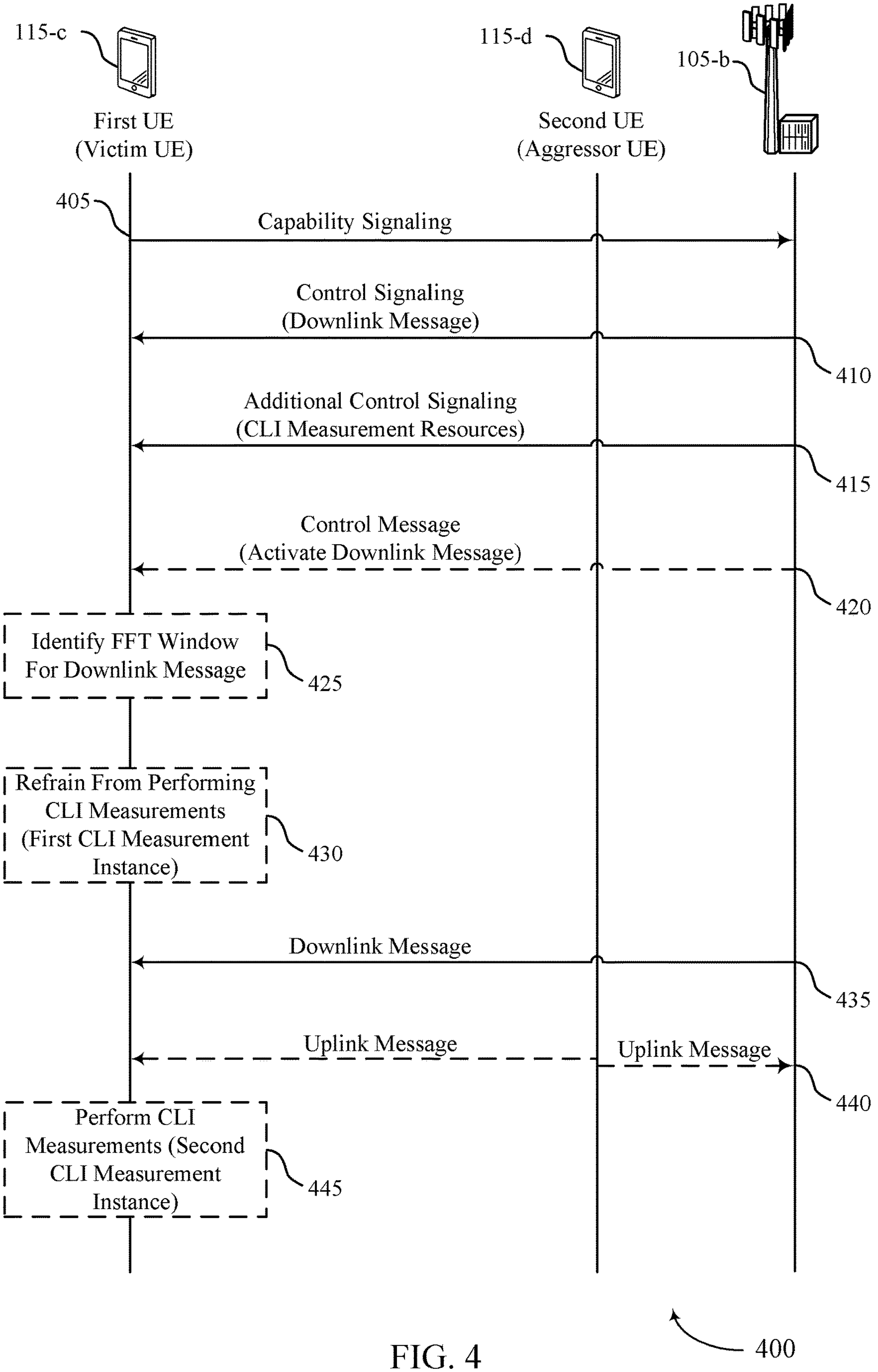
FIG. 4 illustrates an example of a process flow that supports techniques for CLI measurement prioritization in accordance with aspects of the present disclosure.

FIG. 4 illustrates an example of a process flow 400 that supports techniques for CLI measurement prioritization in accordance with aspects of the present disclosure. In some examples, process flow 400 may implement, or be implemented by, aspects of wireless communications system 100, wireless communications system 200, resource configuration 300, or any combination thereof. For example, the process flow 400 may illustrate a victim UE 115-*c* transmitting capability signaling indicating a capability of the victim UE 115-*c* to prioritize reception of downlink messages over CLI measurements, and receiving a downlink message from the network in accordance with the capability signaling, as described with reference to FIGS. 1-3.

In some cases, process flow 400 may include a first UE 115-*c*, a second UE 115-*d*, and a base station 105-*b*, which may be examples of corresponding devices as described herein. The first UE 115-*c* and the second UE 115-*d* illustrated in FIG. 4 may be examples of the first UE 115-*a* and the second UE 115-*b*, respectively, illustrated in FIG. 2. In this regard, the first UE 115-*c* may include an example of a victim UE 115-*c*, and the second UE 115-*d* may include an example of an aggressor UE 115-*d*. Similarly, the base station 105-*b* illustrated in FIG. 4 may be an example of the base station 105-*a* illustrated in FIG. 2.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the first UE 115-*c* may transmit capability signaling (e.g., UE capability message) to the base station 105-*b*. The capability signaling may include an indication of a capability of the first UE 115-*c* to prioritize reception of downlink messages which are scheduled via a first type of scheduling which at least partially overlap with resources used to perform CLI measurements. The first type of scheduling may include semi-static scheduling, SPS, or both. In this regard, the first UE 115-*c* may indicate that it is capable of prioritizing the serving cell downlink channel/signal (e.g., prioritize a scheduled downlink message) that is not dynamically scheduled/triggered over configured CLI measurement resources. Downlink messages which may be prioritized over configured CLI measurement resources may include PDCCH messages, SPS PDSCH messages, periodic CSI-RS, SPS CSI-RS, or any combination thereof.

In some implementations, the capability signaling may indicate the capability of the first UE 115-*c* to prioritize reception of non-dynamically scheduled downlink messages (e.g., downlink messages scheduled via semi-static scheduling and/or SPS) over CLI measurement resources by indicating one or more priority configurations. Each priority configuration may define a set of rules or parameters for prioritizing scheduled downlink messages over conflicting resources used for CLI measurements. In some cases, the first UE 115-*c* may support different capabilities for prioritizing downlink messages over conflicting CLI measurement resources based on the type of downlink message, the type of downlink channel, the type of CLI measurement resource, or any combination thereof. As such, the capability signaling may indicate one or more supported priority configurations depending on the type of downlink channel/message and/or type of CLI measurement resources.

For example, in some cases, the capability signaling may include an indication of a first priority configuration associated with CLI-RSSI measurements, and a second priority configuration associated with SRS RSRP CLI measurements. In this example, the first priority configuration may define a first relative priority between reception of downlink messages scheduled via the first type of scheduling and CLI-RSSI measurements, whereas the second priority configuration may define a second relative priority between reception of downlink messages scheduled via the first type of scheduling and SRS-RSRP CLI measurements. For instance, the capability signaling may further indicate a first set of parameters associated with the first priority configuration, and a second set of parameters associated with the second priority configuration. The first set of one or more parameters may be associated with a first capability of the first UE 115-*c* to prioritize reception of downlink messages scheduled via the first type of scheduling over CLI-RSSI measurements, whereas the second set of one or more parameters are associated with a second capability of the first UE 115-*c* to prioritize reception of downlink messages scheduled via the first type of scheduling over SRS-RSRP CLI measurements.

In this regard, the first and second priority configurations may each define different sets of rules or parameters for prioritizing downlink messages over the respective types of CLI measurements. In other words, in some cases, separate prioritization capabilities may be defined for CLI-RSSI measurements and SRS-RSRP CLI measurements.

In other cases, the capability signaling may indicate a capability of the UE 115-*c* to prioritize downlink messages over CLI measurements based on characteristics of the downlink channel and/or downlink message. In this regard, separate and/or joint capabilities for prioritizing downlink messages over CLI measurements may be defined for each of the serving cell downlink channels and/or downlink signals.

For example, in some cases, the capability signaling may indicate a first priority configuration associated with a first downlink channel and a second priority configuration associated with a second downlink channel. In this example, the first priority configuration may be associated with a first relative priority between downlink messages scheduled over the first downlink channel and CLI measurements, and the second priority configuration may be associated with a second relative priority between downlink messages scheduled over the second downlink channel and CLI measurements.

Similarly, by way of another example, the capability signaling may indicate a first priority configuration associated with a first type of downlink message and a second priority configuration associated with a second type of downlink message. In this example, the first priority configuration may be associated with a first relative priority between the first type of message and CLI measurements, and the second priority configuration may be associated with a second relative priority between the second type of downlink message and CLI measurements.

In some implementations, the capability signaling may indicate one or more offset values (N values) which indicate a minimum offset between reception of a scheduled downlink message and CLI measurement resources which are useable by the UE 115-*c*. In other words, each offset value (e.g., each N value) may define a quantity of symbols (or some other time duration) following reception of a scheduled downlink message during which the first UE 115-*c* is unable to perform CLI measurements. For example, in cases where the UE 115-*c* reports an offset value of two symbols (e.g., N=2), the first UE 115-*c* may be unable to perform CLI measurements for two symbols following reception of a downlink message. Stated differently, by reporting N=2, the first UE 115-*c* may not be expected to perform CLI measurements for at least two symbols following reception of a downlink message.

In some aspects, offset values (N values) may be reserved to account for the maximum timing difference between CLI measurement resources and the serving cell downlink channel and/or downlink signal. In some cases, offset values (N values) may be determined by the SCS of the serving cell. In other words, offset values may be defined as a function of SCS. For example, offset values may be defined according to Table 1 above. Moreover, in some cases, the first UE 115-*c* may support different offsets for different SCSs, different frequency ranges, different types of CLI measurements, or any combination thereof. As such, in some implementations, the capability signaling may indicate different sets of characteristics associated with different offset values. For example, the capability signaling may indicate a first set of characteristics associated with a first offset value ($N_1$) and a second set of characteristics associated with a second offset value ($N_2$), where the respective sets of characteristics include an applicable SCS, a frequency range, a type of CLI measurement, an applicable downlink channel, a type of downlink message, or any combination thereof.

In additional or alternative cases, the indication of the capability of the first UE 115-*c* to prioritize reception of downlink messages scheduled via the first type of scheduling (e.g., semi-static scheduling, SPS) over conflicting CLI measurement resources may serve as an implicit indication that the UE 115-*c* supports a set of pre-defined offset values. For example, in some cases, the offset values defined in Table 1 may include a set of pre-defined offset values. In this example, by indicating that the first UE 115-*c* is able to prioritize reception of downlink messages over CLI measurements, the first UE 115-*c* may implicitly indicate that it supports the pre-defined offset values defined in Table 1.

At 410, the first UE 115-*c* may receive, from the base station 105-*b*, control signaling which indicates a first set of resources for a downlink message from the base station 105-*b* to the first UE 115-*c*. In other words, the control signaling may schedule a downlink message from the base station 105-*b* to the first UE 115-*c*. In some aspects, the control signaling at 410 may schedule the downlink message via the first type of scheduling, which may include semi-static scheduling, SPS, or both. For example, in some implementations, the control signaling at 410 may include RRC signaling which schedules the downlink message.

At 415, the first UE 115-*c* may receive, from the base station 105-*b*, additional control signaling which indicates a second set of resources which are useable by the first UE 115-*c* to perform CLI measurements on signals transmitted by other UEs 115 (e.g., second UE 115-*d*). In some cases, the second set of resources useable by the first UE 115-*c* for performing CLI measurements may at least partially overlap with the first set of resources for the downlink message scheduled via the control signaling at 410. The first and second sets of resources may at least partially overlap in the time domain, the frequency domain, or both. The control signaling at 410 and the additional control signaling at 415 are shown and described as separate control signaling. However, in some implementations, the control signaling at 410 and the additional control signaling at 415 may be indicated via the same control signaling (e.g., single RRC message).

In some aspects, the second set of resources usable for CLI measurements may include resources across a set of CLI measurement instances, where the first UE 115-*c* is configured to perform one or more CLI measurements within each CLI measurement instance. For example, in some cases, RRC signaling (e.g., additional control signaling) may configure the first UE 115-*c* with a set of CLI measurement instances, where the CLI measurement instances are scheduled according to a regular or irregular periodicity.

At 420, the first UE 115-*c* may receive, from the base station 105-*b*, a control message indicating an activation of the first set of resources associated with the downlink message scheduled at 410. In this regard, the control message at 420 may "trigger" or "activate" the downlink message which was scheduled at 410. However, even in cases where the downlink message is triggered/activated via the control message at 420, the first UE 115-*c* may know the resources for the downlink message in advance (e.g., prior to the control message triggering/activating the downlink message). In this regard, the first UE 115-*c* may be able to semi-statically determine the FFT window timing for the downlink message. As such, the downlink message may be scheduled via semi-static scheduling, SPS, or both. The downlink message at 420 may include a DCI message, a MAC-CE, or both.

At 425, the first UE 115-*c* may identify an FFT window for receiving the downlink message. The first UE 115-*c* may identify the FFT window for receiving the downlink message based on transmitting the capability signaling at 405, receiving the control signaling at 410, receiving the additional control signaling at 415, receiving the control message at 420, or any combination thereof. For example, in some cases, the first UE 115-*c* may identify the FFT window at 425 based on identifying that the first set of resources for the downlink message and the second set of resources for the CLI measurements at least partially overlap in the time domain. In this example, the first UE 115-*c* may further identify the FFT window for the downlink message based on the first UE 115-*c* indicating (via the capability signaling) that it may prioritize reception of downlink messages over CLI measurements.

At 430, the first UE 115-*c* may refrain from performing CLI measurements. In particular, the first UE 115-*c* may refrain from performing CLI measurements so that the first UE 115-*c* may receive the downlink message scheduled via the control signaling at 410. In this regard, the first UE 115-*c* may refrain from performing CLI measurements based on the first set of resources for the downlink message overlapping with the second set of resources for CLI measurements. The first UE 115-*c* may refrain from performing the CLI measurements at 430 based on transmitting the capability signaling at 405, receiving the control signaling at 410, receiving the additional control signaling at 415, receiving the control message at 420, identifying the FFT window at 425, or any combination thereof.

For example, as noted previously herein, the second set of resources for CLI measurements may include a set of CLI measurement instances. In this example, the first set of resources for the downlink message may overlap with a first CLI measurement instance of the second set of resources. As such, the first UE 115-*c* may refrain from performing CLI measurements within the first CLI measurement instance so that the first UE 115-*c* may instead receive the scheduled downlink message.

At 435, the first UE 115-*c* may receive the downlink message from the base station 105-*b*. In particular, the first UE 115-*c* may receive the downlink message within the first set of resources allocated for the downlink message via the control signaling at 410. The downlink message may include a PDCCH message, a PDSCH message (e.g., SPS PDSCH message), a CSI-RS (e.g., periodic SPS CSI-RS, an aperiodic SPS CSI-RS), or any combination thereof.

The first UE 115-*c* may receive the downlink message based on (e.g., within, using) the FFT window identified at 430. Conversely, the base station 105-*b* may transmit the downlink message at 435 based on receiving (via the capability signaling) the indication that the first UE 115-*c* is capable of prioritizing downlink messages over CLI measurements. Additionally, or alternatively, the first UE 115-*c* may receive the downlink message at 435 based on transmitting the capability signaling at 405, receiving the control signaling at 410, receiving the additional control signaling at 415, receiving the control message at 420, refraining from performing the CLI measurements at 430, or any combination thereof.

For example, the first UE 115-*c* may receive the downlink message in accordance with one or more priority configurations indicated via the capability signaling at 405. For instance, as noted previously herein, the first UE 115-*c* may support one or more priority configurations which define different rules/parameters for prioritizing downlink messages over conflicting CLI measurements. Each of the priority configurations may be associated with different sets of characteristics/parameters, including a type of downlink message, downlink channel, type of CLI measurement, and the like. In this example, the first UE 115-*c* may support a priority configuration for prioritizing PDCCH messages over conflicting CLI-RSSI measurements. As such, in cases where the downlink message includes a PDCCH message and the second set of resources are allocated for CLI-RSSI measurements, the first UE 115-*c* may receive the downlink message (e.g., PDCCH message) at 435 in accordance with the priority configuration.

At 440, the second UE 115-*d* may transmit an uplink message to the base station 105-*b*. The uplink message may include a PUCCH message, a PUSCH message, an SRS, or any combination thereof. As noted previously herein, the uplink message may not be intended for the first UE 115-*c*, but may be intercepted, or otherwise received, by the first UE 115-*c*, which may result in CLI at the first UE 115-*c*.

At 445, the first UE 115-*c* may perform CLI measurements on the uplink message transmitted by the second UE 115-*d* at 440. In some cases, the first UE 115-*c* may receive the uplink message at 440 and perform the CLI measurements at 445 within a CLI measurement instance for performing CLI measurements at the first UE 115-*c*. The CLI measurements may include CSI-RSSI measurements, SRS-RSRP CLI measurements, or both.

For example, as noted previously herein, the second set of resources for CLI measurements may include a set of CLI measurement instances. In this example, the first set of resources for the downlink message may overlap with a first CLI measurement instance of the second set of resources. As such, the first UE 115-*c* may refrain from performing CLI measurements within the first CLI measurement instance at 430 so that the first UE 115-*c* may instead receive the scheduled downlink message at 435. Continuing with the same example, the first UE 115-*c* may subsequently receive the uplink message from the second UE 115-*d* within a second CLI measurement instance which is subsequent to the first CLI measurement instance. In this regard, the first UE 115-*c* may perform CLI measurements on the uplink message received within the second CLI measurement instance.

Techniques described herein may enable the first UE 115-*c* to prioritize reception of downlink messages from the network over CLI measurements. As such, techniques described herein may lead to improved resource utilization within the wireless communications system, and reduce a latency of communications between the first UE 115-*c* and the network. Moreover, techniques described herein may enable more flexible and tailored solutions for CLI measurement by victim UEs 115.

Figure 5:
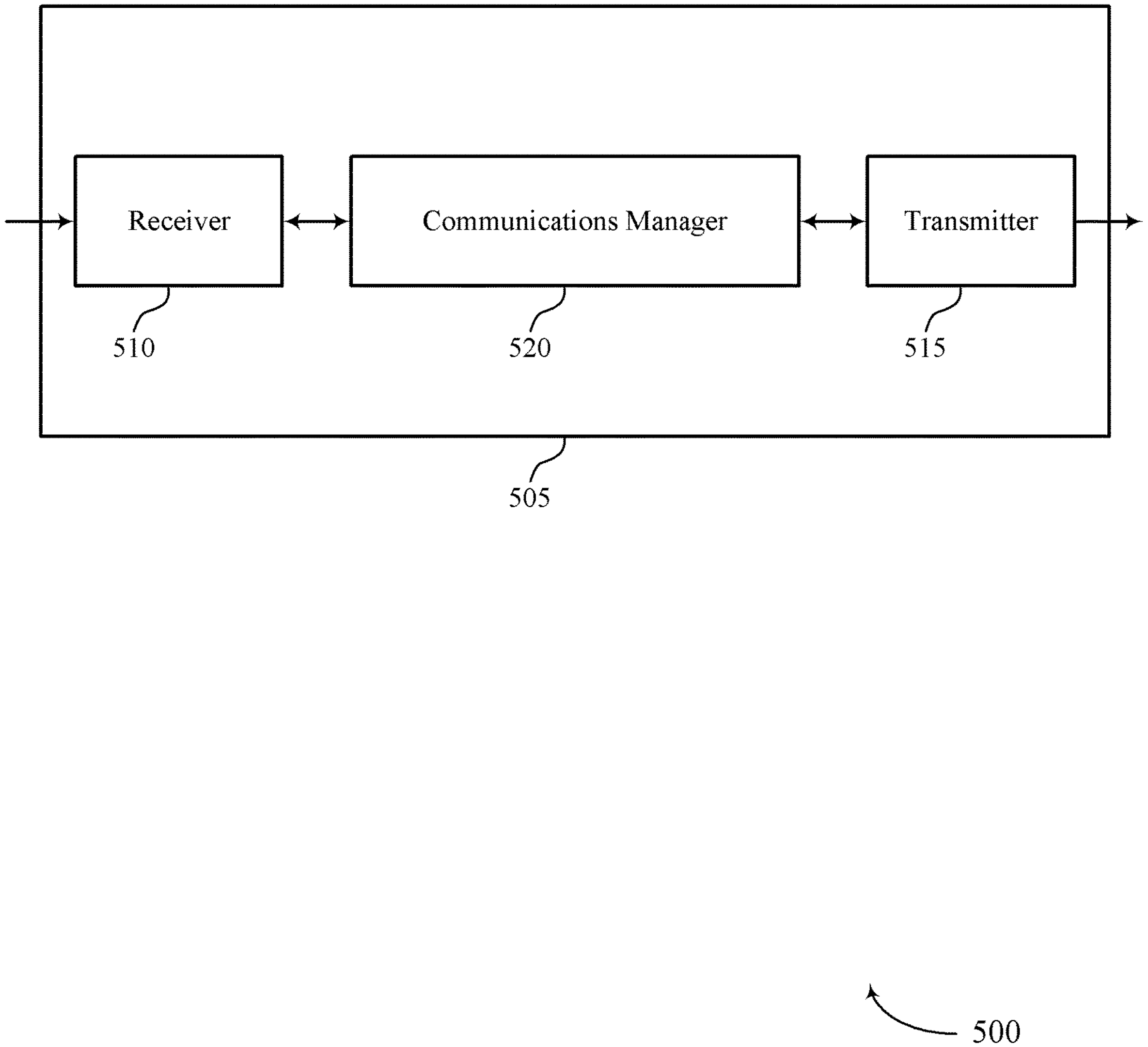
FIGS. 5 and 6 show block diagrams of devices that support techniques for CLI measurement prioritization in accordance with aspects of the present disclosure.

FIG. 5 shows a block diagram 500 of a device 505 that supports techniques for CLI measurement prioritization in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for CLI measurement prioritization). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for CLI measurement prioritization). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for CLI measurement prioritization as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for transmitting, to a base station, capability signaling including an indication of a capability of the first UE to prioritize reception of downlink messages scheduled via a first type of scheduling which at least partially overlap with resources used to perform CLI measurements. The communications manager 520 may be configured as or otherwise support a means for receiving, from the base station, control signaling indicating a first set of resources for a downlink message from the base station to the first UE. The communications manager 520 may be configured as or otherwise support a means for receiving, from the base station, additional control signaling indicating a second set of resources usable by the first UE to perform CLI measurements on signals transmitted by a second UE, where the second set of resources at least partially overlap with the first set of resources in a time domain. The communications manager 520 may be configured as or otherwise support a means for receiving the downlink message from the base station within the first set of resources based on the indication of the capability.

By including or configuring the communications manager 520 in accordance with examples as described herein, the device 505 (e.g., a processor controlling or otherwise coupled to the receiver 510, the transmitter 515, the communications manager 520, or a combination thereof) may support techniques which enable the UEs 115 to prioritize reception of downlink messages from the network over CLI measurements. As such, techniques described herein may lead to improved resource utilization within the wireless communications system, and reduce a latency of communications between the first UE 115 and the network. Moreover, techniques described herein may enable more flexible and tailored solutions for CLI measurement by victim UEs 115.

Figure 6:
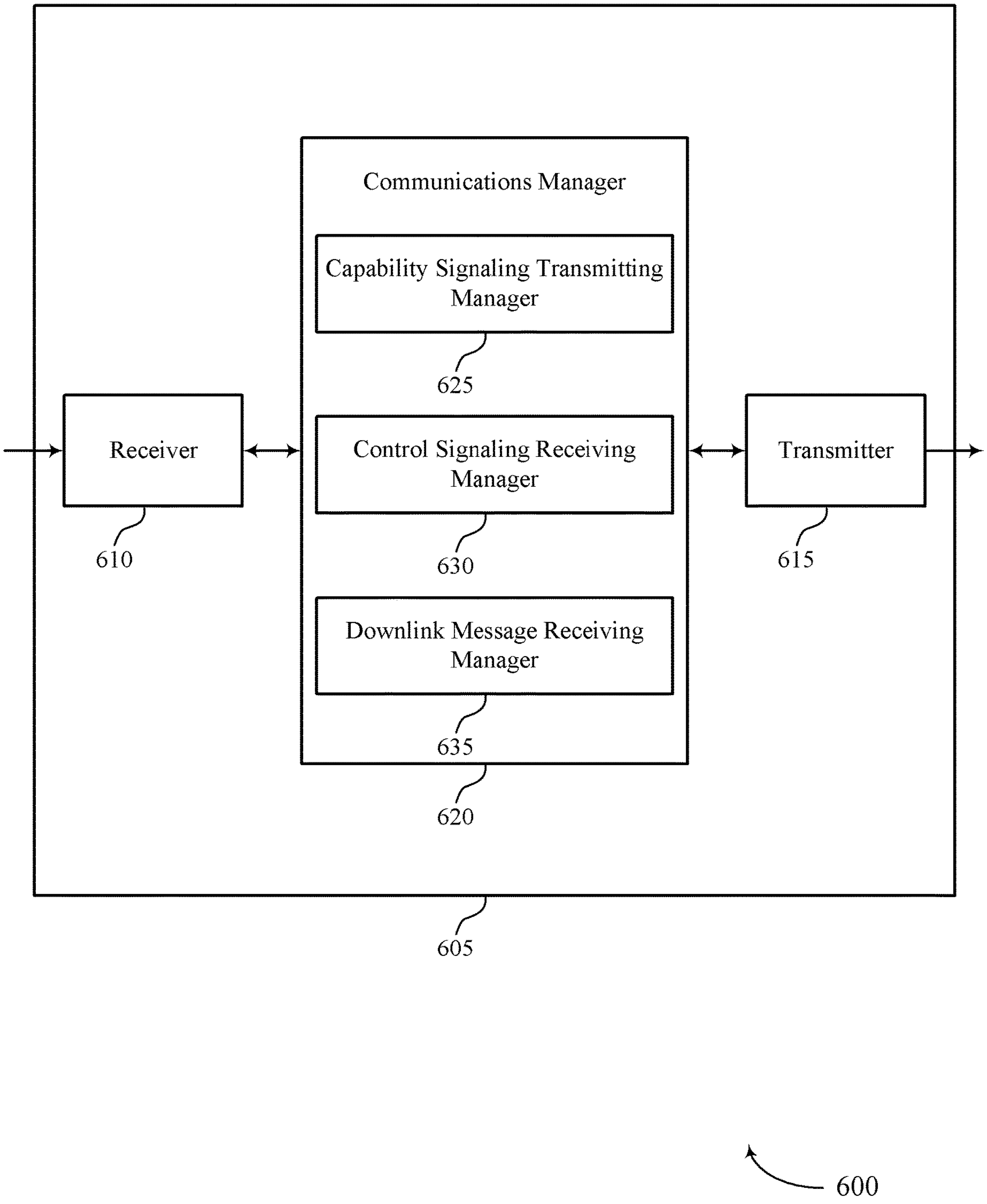

FIG. 6 shows a block diagram 600 of a device 605 that supports techniques for CLI measurement prioritization in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for CLI measurement prioritization). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for CLI measurement prioritization). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for CLI measurement prioritization as described herein. For example, the communications manager 620 may include a capability signaling transmitting manager 625, a control signaling receiving manager 630, a downlink message receiving manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The capability signaling transmitting manager 625 may be configured as or otherwise support a means for transmitting, to a base station, capability signaling including an indication of a capability of the first UE to prioritize reception of downlink messages scheduled via a first type of scheduling which at least partially overlap with resources used to perform CLI measurements. The control signaling receiving manager 630 may be configured as or otherwise support a means for receiving, from the base station, control signaling indicating a first set of resources for a downlink message from the base station to the first UE. The control signaling receiving manager 630 may be configured as or otherwise support a means for receiving, from the base station, additional control signaling indicating a second set of resources usable by the first UE to perform CLI measurements on signals transmitted by a second UE, where the second set of resources at least partially overlap with the first set of resources in a time domain. The downlink message receiving manager 635 may be configured as or otherwise support a means for receiving the downlink message from the base station within the first set of resources based on the indication of the capability.

Figure 7:
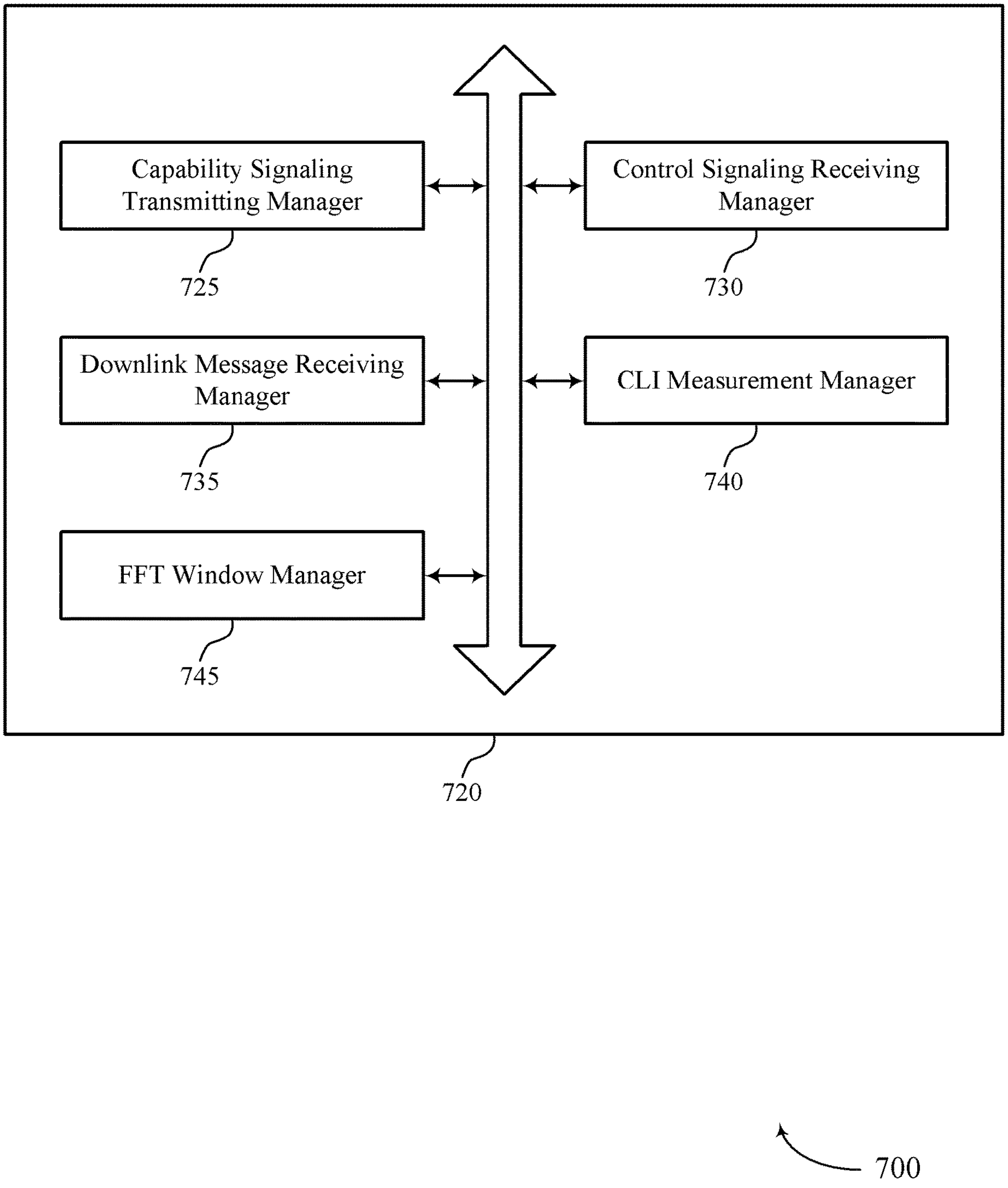
FIG. 7 shows a block diagram of a communications manager that supports techniques for CLI measurement prioritization in accordance with aspects of the present disclosure.

FIG. 7 shows a block diagram 700 of a communications manager 720 that supports techniques for CLI measurement prioritization in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for CLI measurement prioritization as described herein. For example, the communications manager 720 may include a capability signaling transmitting manager 725, a control signaling receiving manager 730, a downlink message receiving manager 735, a CLI measurement manager 740, an FFT window manager 745, or any combination thereof. Each of these components may communicate, directly or indirectly, with one another (e.g., via one or more buses).

The communications manager 720 may support wireless communication at a first UE in accordance with examples as disclosed herein. The capability signaling transmitting manager 725 may be configured as or otherwise support a means for transmitting, to a base station, capability signaling including an indication of a capability of the first UE to prioritize reception of downlink messages scheduled via a first type of scheduling which at least partially overlap with resources used to perform CLI measurements. The control signaling receiving manager 730 may be configured as or otherwise support a means for receiving, from the base station, control signaling indicating a first set of resources for a downlink message from the base station to the first UE. In some examples, the control signaling receiving manager 730 may be configured as or otherwise support a means for receiving, from the base station, additional control signaling indicating a second set of resources usable by the first UE to perform CLI measurements on signals transmitted by a second UE, where the second set of resources at least partially overlap with the first set of resources in a time domain. The downlink message receiving manager 735 may be configured as or otherwise support a means for receiving the downlink message from the base station within the first set of resources based on the indication of the capability.

In some examples, the CLI measurement manager 740 may be configured as or otherwise support a means for refraining from performing the CLI measurements within the second set of resources based on the indication of the capability.

In some examples, the second set of resources include a set of multiple CLI measurement instances, and the CLI measurement manager 740 may be configured as or otherwise support a means for receiving one or more signals from the second UE within a second CLI measurement instance of the set of multiple CLI measurement instances, where the second CLI measurement instance is subsequent to the first CLI measurement instance. In some examples, the second set of resources include a set of multiple CLI measurement instances, and the CLI measurement manager 740 may be configured as or otherwise support a means for performing the CLI measurements on the one or more signals received within the second CLI measurement instance based on refraining from performing the CLI measurements within the first CLI measurement instance.

In some examples, to support transmitting the capability signaling, the capability signaling transmitting manager 725 may be configured as or otherwise support a means for transmitting an indication of one or more offset values, where each offset value of the one or more offset values includes a quantity of symbols following reception of the downlink message from the base station during which the first UE is unable to perform CLI measurements.

In some examples, to support transmitting the capability signaling, the capability signaling transmitting manager 725 may be configured as or otherwise support a means for transmitting an indication of a first set of one or more characteristics associated with a first offset value. In some examples, to support transmitting the capability signaling, the capability signaling transmitting manager 725 may be configured as or otherwise support a means for transmitting an indication of a second set of one or more characteristics associated with a second offset value, where the first set of one or more characteristics, the second set of one or more characteristics, or both, includes a subcarrier spacing, a frequency range, a type of CLI measurement, or any combination thereof.

In some examples, the indication of the capability of the first UE to prioritize reception of downlink messages which at least partially overlap with resources used to perform CLI measurements further includes an indication of a second capability of the UE to support one or more pre-defined offset values. In some examples, each pre-defined offset value of the one or more pre-defined offset values includes a quantity of symbols following reception of the downlink message during which the first UE is unable to perform CLI measurements.

In some examples, to support transmitting the capability signaling, the capability signaling transmitting manager 725 may be configured as or otherwise support a means for transmitting an indication of a first priority configuration associated with a first relative priority between reception of downlink messages scheduled via the first type of scheduling and CLI-RSSI measurements. In some examples, to support transmitting the capability signaling, the capability signaling transmitting manager 725 may be configured as or otherwise support a means for transmitting an indication of a second priority configuration associated with a second relative priority between reception of downlink messages scheduled via the first type of scheduling and SRS-RSRP CLI measurements, where the first UE receives the downlink message in accordance with the first priority configuration or the second priority configuration.

In some examples, to support transmitting the capability signaling, the capability signaling transmitting manager 725 may be configured as or otherwise support a means for transmitting an indication of a first set of one or more parameters associated with the first priority configuration, the first set of one or more parameters associated with a first capability of the first UE to prioritize reception of downlink messages scheduled via the first type of scheduling over CLI-RSSI measurements. In some examples, to support transmitting the capability signaling, the capability signaling transmitting manager 725 may be configured as or otherwise support a means for transmitting an indication of a second set of one or more parameters associated with the second priority configuration, the second set of one or more parameters different from the first set of one or more parameters, the second set of one or more parameters associated with a second capability of the first UE to prioritize reception of downlink messages scheduled via the first type of scheduling over SRS-RSRP CLI measurements.

In some examples, to support transmitting the capability signaling, the capability signaling transmitting manager 725 may be configured as or otherwise support a means for transmitting an indication of a first priority configuration associated with a first downlink channel, a first type of downlink message, or both, the first priority configuration associated with a first relative priority between reception of downlink messages scheduled via the first type of scheduling and CLI measurements. In some examples, to support transmitting the capability signaling, the capability signaling transmitting manager 725 may be configured as or otherwise support a means for transmitting an indication of a second priority configuration associated with a second downlink channel, a second type of downlink message, or both, the second priority configuration associated with a second relative priority between reception of downlink messages scheduled via the first type of scheduling and CLI measurements, where the first UE receives the downlink message in accordance with the first priority configuration or the second priority configuration.

In some examples, the first type of scheduling includes semi-static scheduling, SPS, or both. In some examples, a second type of scheduling different from the first type of scheduling includes dynamic scheduling.

In some examples, the FFT window manager 745 may be configured as or otherwise support a means for identifying an FFT window for receiving the downlink message based on transmitting the capability signaling, receiving the control signaling, or both, where the downlink message is received based on the identified FFT window.

In some examples, the control signaling receiving manager 730 may be configured as or otherwise support a means for receiving, from the base station, a control message indicating an activation of the first set of resources, where receiving the downlink message is based on receiving the control message.

In some examples, the indication of the capability of the first UE to prioritize reception of downlink messages which at least partially overlap with resources used to perform CLI measurements further includes an indication of a second capability of the UE to support one or more pre-defined offset values. In some examples, each pre-defined offset value of the one or more pre-defined offset values includes a quantity of symbols following reception of the downlink message during which the first UE is unable to perform CLI measurements.

Figure 8:
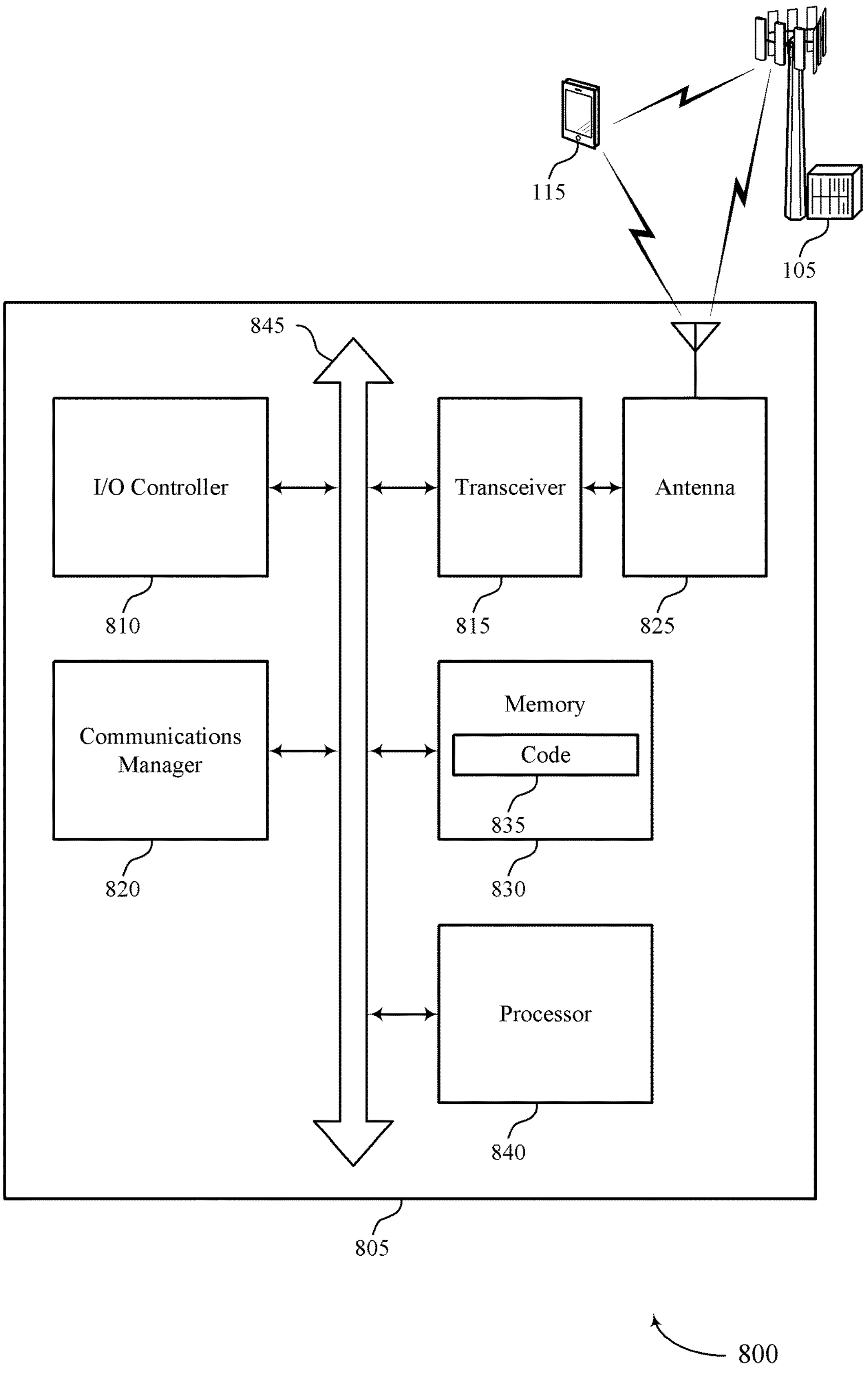
FIG. 8 shows a diagram of a system including a device that supports techniques for CLI measurement prioritization in accordance with aspects of the present disclosure.

FIG. 8 shows a diagram of a system 800 including a device 805 that supports techniques for CLI measurement prioritization in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for CLI measurement prioritization). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for transmitting, to a base station, capability signaling including an indication of a capability of the first UE to prioritize reception of downlink messages scheduled via a first type of scheduling which at least partially overlap with resources used to perform CLI measurements. The communications manager 820 may be configured as or otherwise support a means for receiving, from the base station, control signaling indicating a first set of resources for a downlink message from the base station to the first UE. The communications manager 820 may be configured as or otherwise support a means for receiving, from the base station, additional control signaling indicating a second set of resources usable by the first UE to perform CLI measurements on signals transmitted by a second UE, where the second set of resources at least partially overlap with the first set of resources in a time domain. The communications manager 820 may be configured as or otherwise support a means for receiving the downlink message from the base station within the first set of resources based on the indication of the capability.

By including or configuring the communications manager 820 in accordance with examples as described herein, the device 805 may support techniques which enable the UEs 115 to prioritize reception of downlink messages from the network over CLI measurements. As such, techniques described herein may lead to improved resource utilization within the wireless communications system, and reduce a latency of communications between the first UE 115 and the network. Such improvements may result in improved user experience, and improved coordination between the UEs 115 and the network. Moreover, techniques described herein may enable more flexible and tailored solutions for CLI measurement by victim UEs 115.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for CLI measurement prioritization as described herein, or the processor 840 and the memory 830 may be otherwise configured to perform or support such operations.

Figure 9:
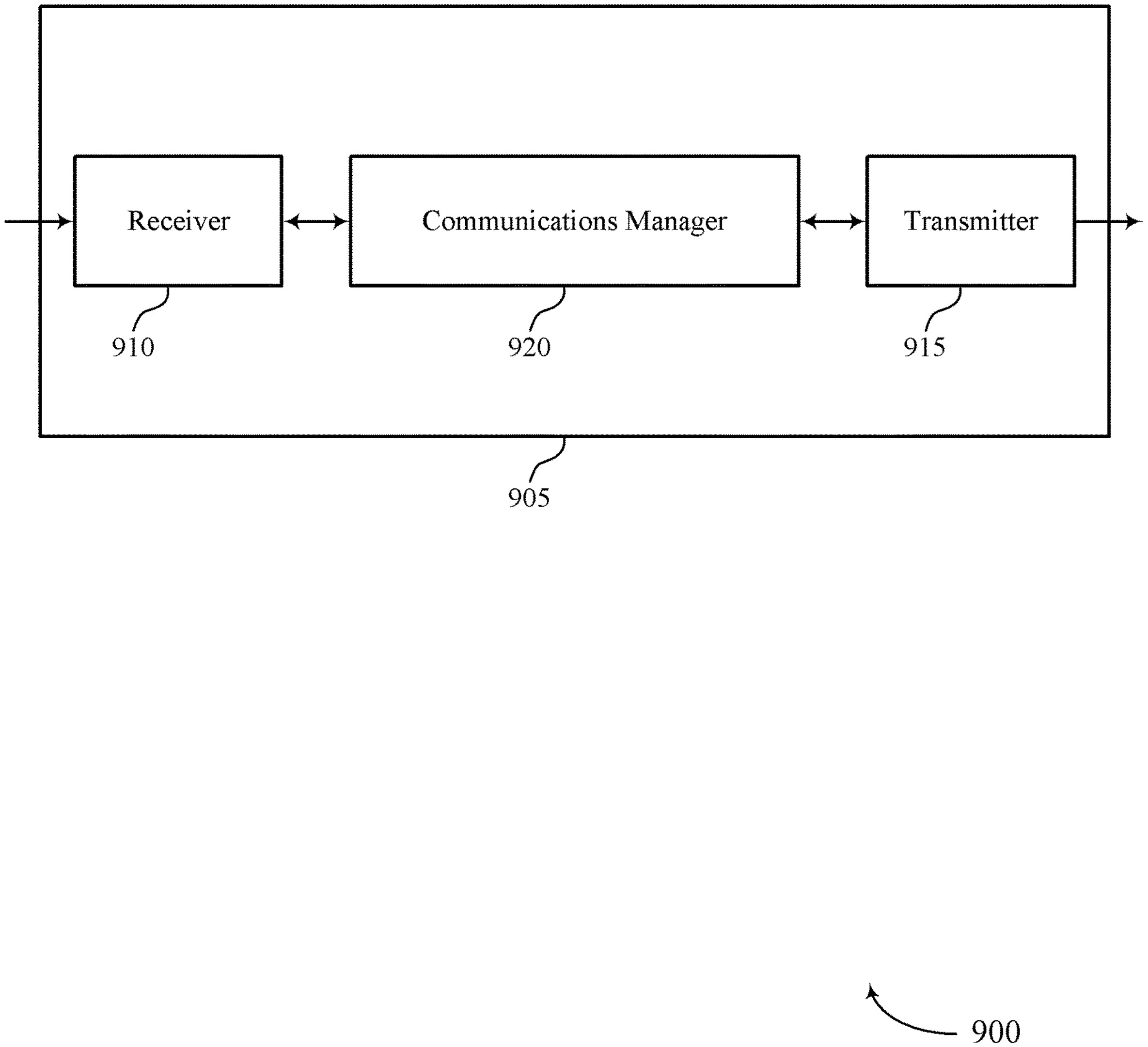
FIGS. 9 and 10 show block diagrams of devices that support techniques for CLI measurement prioritization in accordance with aspects of the present disclosure.

FIG. 9 shows a block diagram 900 of a device 905 that supports techniques for CLI measurement prioritization in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for CLI measurement prioritization). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for CLI measurement prioritization). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for CLI measurement prioritization as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for receiving, from a first UE, capability signaling including an indication of a capability of the first UE to prioritize reception of downlink messages scheduled via a first type of scheduling which at least partially overlap with resources used to perform CLI measurements. The communications manager 920 may be configured as or otherwise support a means for transmitting, to the first UE, control signaling indicating a first set of resources for a downlink message from the base station to the first UE. The communications manager 920 may be configured as or otherwise support a means for transmitting, to the first UE, additional control signaling indicating a second set of resources usable by the first UE to perform CLI measurements on signals transmitted by a second UE, where the second set of resources at least partially overlap with the first set of resources in a time domain. The communications manager 920 may be configured as or otherwise support a means for transmitting the downlink message to the first UE within the first set of resources based on the indication of the capability.

By including or configuring the communications manager 920 in accordance with examples as described herein, the device 905 (e.g., a processor controlling or otherwise coupled to the receiver 910, the transmitter 915, the communications manager 920, or a combination thereof) may support techniques which enable the UEs 115 to prioritize reception of downlink messages from the network over CLI measurements. As such, techniques described herein may lead to improved resource utilization within the wireless communications system, and reduce a latency of communications between the first UE 115 and the network. Moreover, techniques described herein may enable more flexible and tailored solutions for CLI measurement by victim UEs 115.

Figure 10:
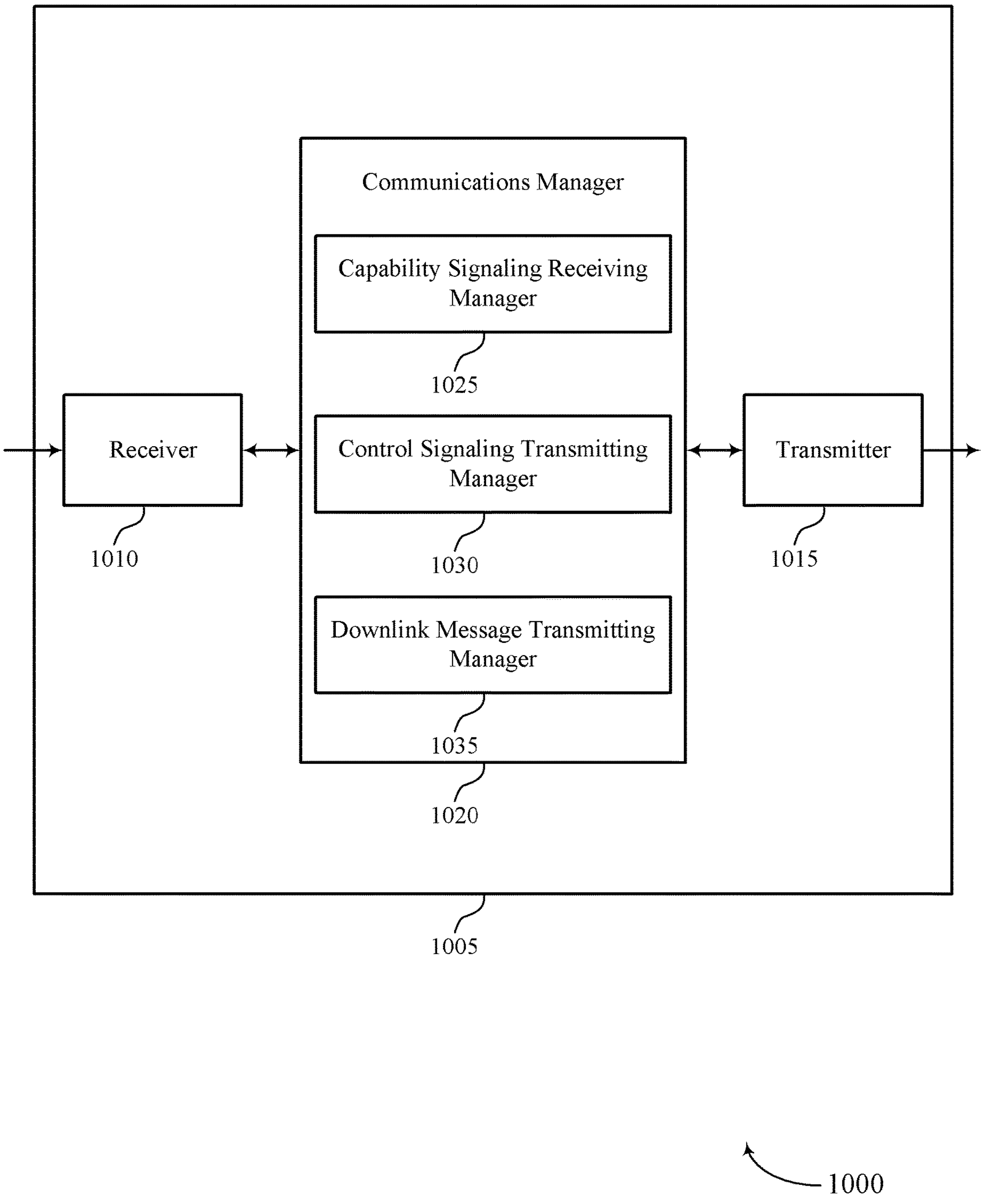

FIG. 10 shows a block diagram 1000 of a device 1005 that supports techniques for CLI measurement prioritization in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for CLI measurement prioritization). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for CLI measurement prioritization). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for CLI measurement prioritization as described herein. For example, the communications manager 1020 may include a capability signaling receiving manager 1025, a control signaling transmitting manager 1030, a downlink message transmitting manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The capability signaling receiving manager 1025 may be configured as or otherwise support a means for receiving, from a first UE, capability signaling including an indication of a capability of the first UE to prioritize reception of downlink messages scheduled via a first type of scheduling which at least partially overlap with resources used to perform CLI measurements. The control signaling transmitting manager 1030 may be configured as or otherwise support a means for transmitting, to the first UE, control signaling indicating a first set of resources for a downlink message from the base station to the first UE. The control signaling transmitting manager 1030 may be configured as or otherwise support a means for transmitting, to the first UE, additional control signaling indicating a second set of resources usable by the first UE to perform CLI measurements on signals transmitted by a second UE, where the second set of resources at least partially overlap with the first set of resources in a time domain. The downlink message transmitting manager 1035 may be configured as or otherwise support a means for transmitting the downlink message to the first UE within the first set of resources based on the indication of the capability.

Figure 11:
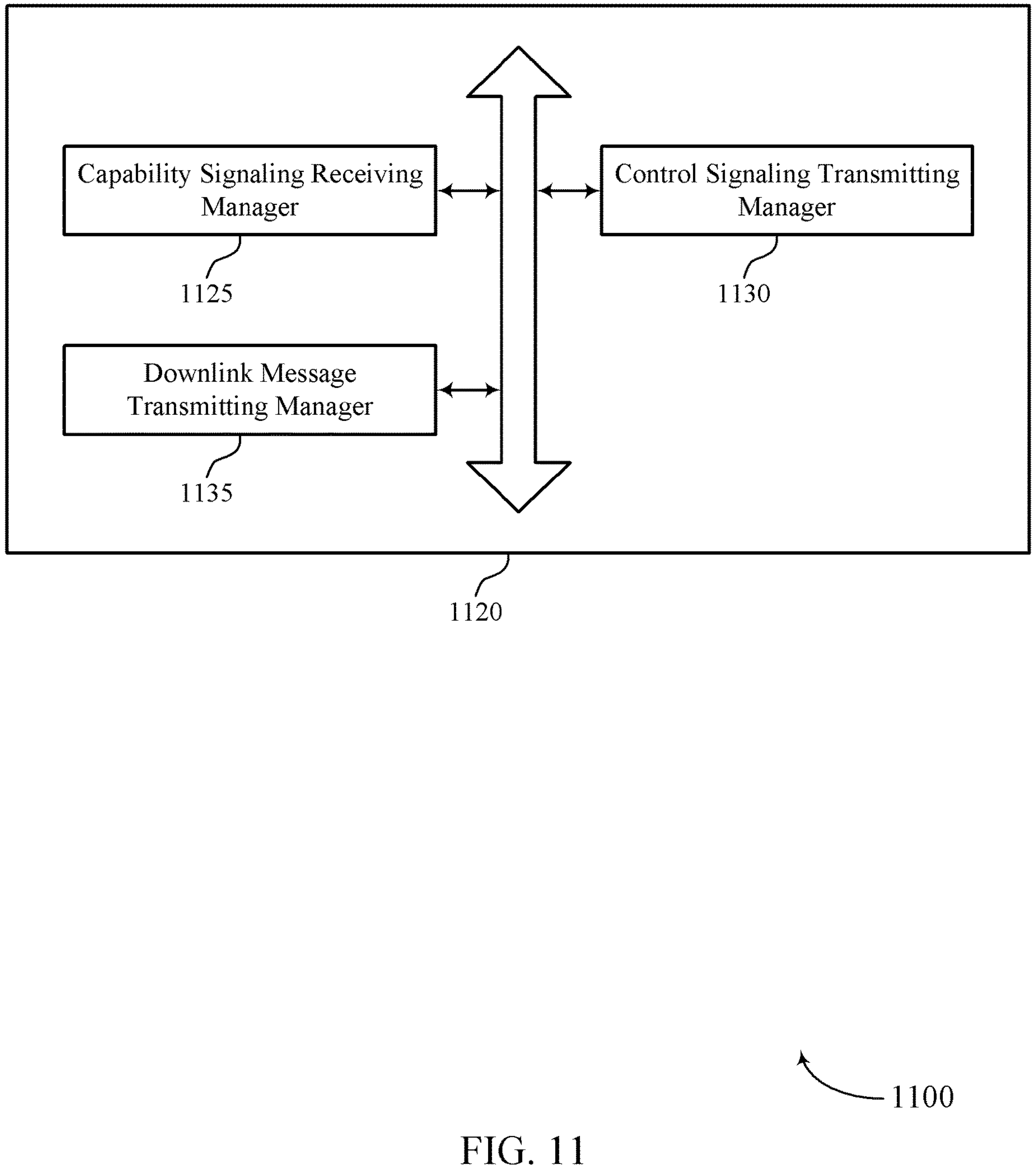
FIG. 11 shows a block diagram of a communications manager that supports techniques for CLI measurement prioritization in accordance with aspects of the present disclosure.

FIG. 11 shows a block diagram 1100 of a communications manager 1120 that supports techniques for CLI measurement prioritization in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for CLI measurement prioritization as described herein. For example, the communications manager 1120 may include a capability signaling receiving manager 1125, a control signaling transmitting manager 1130, a downlink message transmitting manager 1135, or any combination thereof. Each of these components may communicate, directly or indirectly, with one another (e.g., via one or more buses).

The communications manager 1120 may support wireless communication at a base station in accordance with examples as disclosed herein. The capability signaling receiving manager 1125 may be configured as or otherwise support a means for receiving, from a first UE, capability signaling including an indication of a capability of the first UE to prioritize reception of downlink messages scheduled via a first type of scheduling which at least partially overlap with resources used to perform CLI measurements. The control signaling transmitting manager 1130 may be configured as or otherwise support a means for transmitting, to the first UE, control signaling indicating a first set of resources for a downlink message from the base station to the first UE. In some examples, the control signaling transmitting manager 1130 may be configured as or otherwise support a means for transmitting, to the first UE, additional control signaling indicating a second set of resources usable by the first UE to perform CLI measurements on signals transmitted by a second UE, where the second set of resources at least partially overlap with the first set of resources in a time domain. The downlink message transmitting manager 1135 may be configured as or otherwise support a means for transmitting the downlink message to the first UE within the first set of resources based on the indication of the capability.

In some examples, to support receiving the capability signaling, the capability signaling receiving manager 1125 may be configured as or otherwise support a means for receiving an indication of one or more offset values, where each offset value of the one or more offset values includes a quantity of symbols following reception of the downlink message from the base station during which the first UE is unable to perform CLI measurements.

In some examples, to support receiving the capability signaling, the capability signaling receiving manager 1125 may be configured as or otherwise support a means for receiving an indication of a first set of one or more characteristics associated with a first offset value. In some examples, to support receiving the capability signaling, the capability signaling receiving manager 1125 may be configured as or otherwise support a means for receiving an indication of a second set of one or more characteristics associated with a second offset value, where the first set of one or more characteristics, the second set of one or more characteristics, or both, includes a subcarrier spacing, a frequency range, a type of CLI measurement, or any combination thereof.

In some examples, to support receiving the capability signaling, the capability signaling receiving manager 1125 may be configured as or otherwise support a means for receiving an indication of a first priority configuration associated with a first relative priority between reception of downlink messages scheduled via the first type of scheduling and CLI-RSSI measurements. In some examples, to support receiving the capability signaling, the capability signaling receiving manager 1125 may be configured as or otherwise support a means for receiving an indication of a second priority configuration associated with a second relative priority between reception of downlink messages scheduled via the first type of scheduling and SRS-RSRP CLI measurements, where the base station transmits the downlink message in accordance with the first priority configuration or the second priority configuration.

In some examples, to support receiving the capability signaling, the capability signaling receiving manager 1125 may be configured as or otherwise support a means for receiving an indication of a first set of one or more parameters associated with the first priority configuration, the first set of one or more parameters associated with a first capability of the first UE to prioritize reception of downlink messages scheduled via the first type of scheduling over CLI-RSSI measurements. In some examples, to support receiving the capability signaling, the capability signaling receiving manager 1125 may be configured as or otherwise support a means for receiving an indication of a second set of one or more parameters associated with the second priority configuration, the second set of one or more parameters different from the first set of one or more parameters, the second set of one or more parameters associated with a second capability of the first UE to prioritize reception of downlink messages scheduled via the first type of scheduling over SRS-RSRP CLI measurements.

In some examples, to support receiving the capability signaling, the capability signaling receiving manager 1125 may be configured as or otherwise support a means for receiving an indication of a first priority configuration associated with a first downlink channel, a first type of downlink message, or both, the first priority configuration associated with a first relative priority between reception of downlink messages scheduled via the first type of scheduling and CLI measurements. In some examples, to support receiving the capability signaling, the capability signaling receiving manager 1125 may be configured as or otherwise support a means for receiving an indication of a second priority configuration associated with a second downlink channel, a second type of downlink message, or both, the second priority configuration associated with a second relative priority between reception of downlink messages scheduled via the first type of scheduling and CLI measurements, where the base station transmits the downlink message in accordance with the first priority configuration or the second priority configuration.

In some examples, the first type of scheduling includes semi-static scheduling, SPS, or both. In some examples, a second type of scheduling different from the first type of scheduling includes dynamic scheduling.

In some examples, the control signaling transmitting manager 1130 may be configured as or otherwise support a means for transmitting, to the first UE, a control message indicating an activation of the first set of resources, where transmitting the downlink message is based on transmitting the control message.

Figure 12:
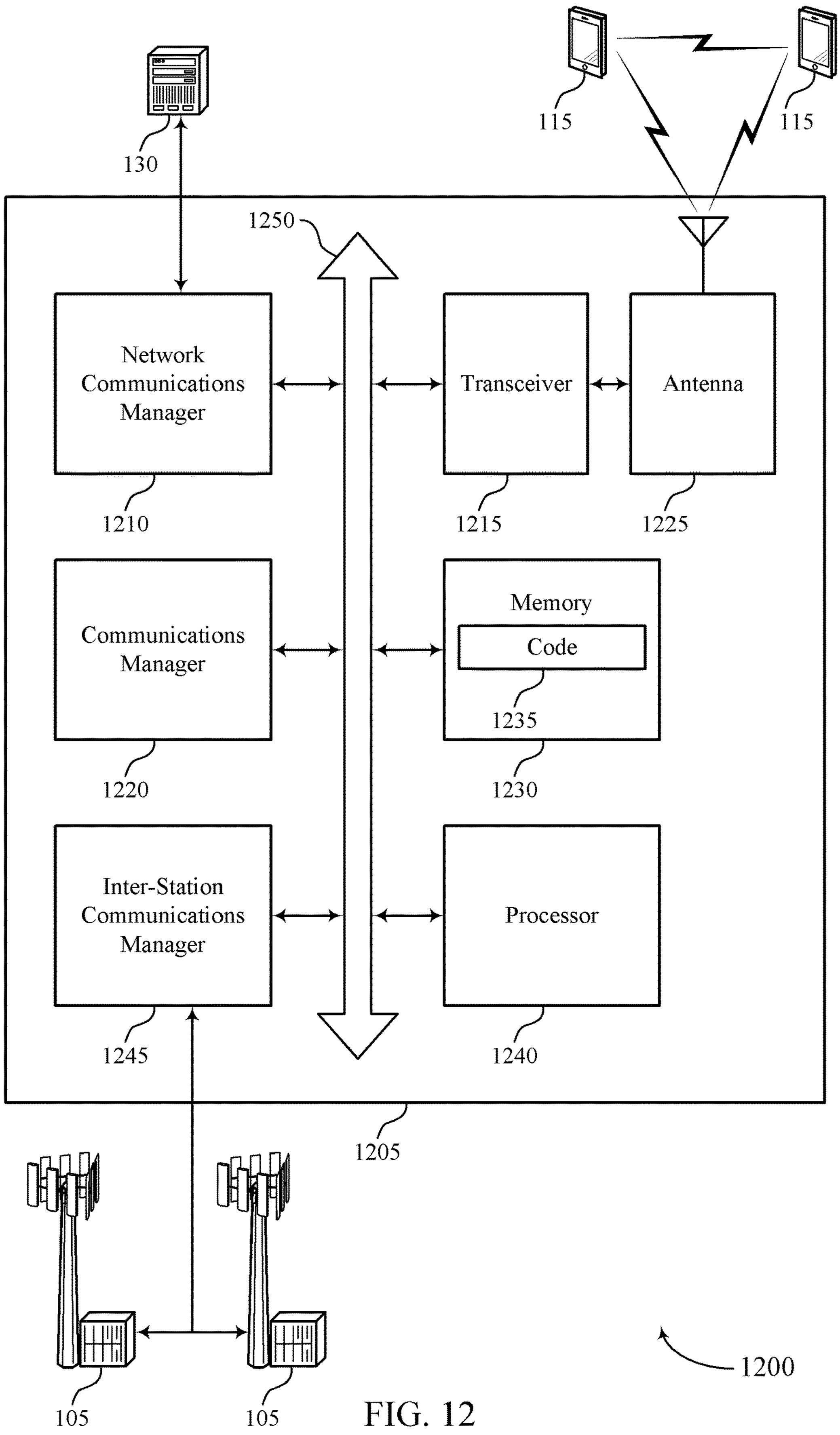
FIG. 12 shows a diagram of a system including a device that supports techniques for CLI measurement prioritization in accordance with aspects of the present disclosure.

FIG. 12 shows a diagram of a system 1200 including a device 1205 that supports techniques for CLI measurement prioritization in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for CLI measurement prioritization). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for receiving, from a first UE, capability signaling including an indication of a capability of the first UE to prioritize reception of downlink messages scheduled via a first type of scheduling which at least partially overlap with resources used to perform CLI measurements. The communications manager 1220 may be configured as or otherwise support a means for transmitting, to the first UE, control signaling indicating a first set of resources for a downlink message from the base station to the first UE. The communications manager 1220 may be configured as or otherwise support a means for transmitting, to the first UE, additional control signaling indicating a second set of resources usable by the first UE to perform CLI measurements on signals transmitted by a second UE, where the second set of resources at least partially overlap with the first set of resources in a time domain. The communications manager 1220 may be configured as or otherwise support a means for transmitting the downlink message to the first UE within the first set of resources based on the indication of the capability.

By including or configuring the communications manager 1220 in accordance with examples as described herein, the device 1205 may support techniques which enable the UEs 115 to prioritize reception of downlink messages from the network over CLI measurements. As such, techniques described herein may lead to improved resource utilization within the wireless communications system, and reduce a latency of communications between the first UE 115 and the network. Moreover, techniques described herein may enable more flexible and tailored solutions for CLI measurement by victim UEs 115.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for CLI measurement prioritization as described herein, or the processor 1240 and the memory 1230 may be otherwise configured to perform or support such operations.

Figure 13:
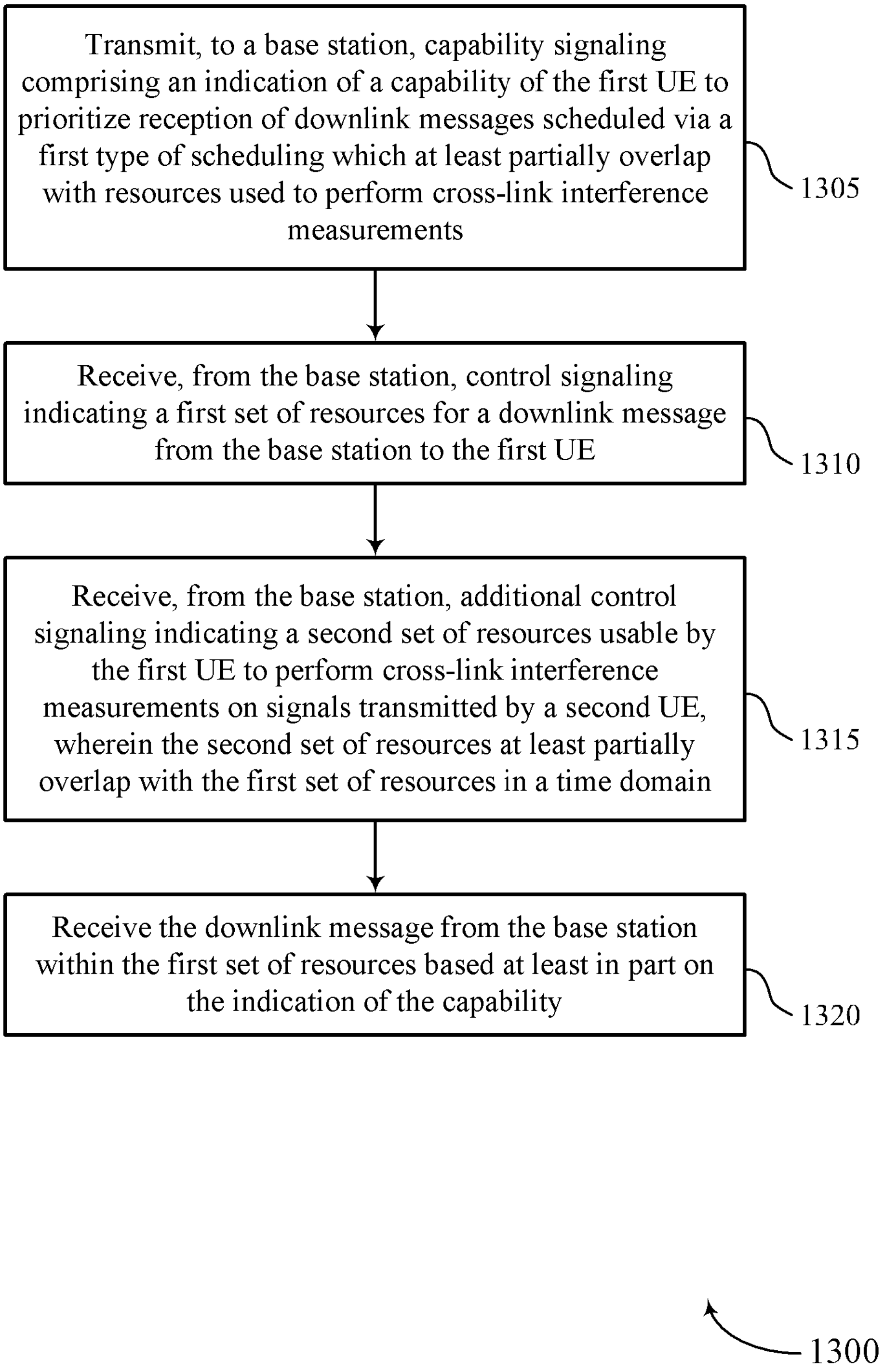
FIGS. 13 through 16 show flowcharts illustrating methods that support techniques for CLI measurement prioritization in accordance with aspects of the present disclosure.

FIG. 13 shows a flowchart illustrating a method 1300 that supports techniques for CLI measurement prioritization in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, capability signaling including an indication of a capability of the first UE to prioritize reception of downlink messages scheduled via a first type of scheduling which at least partially overlap with resources used to perform CLI measurements. The operations of 1305 may be performed in accordance with examples as disclosed herein. In some examples, aspects of the operations of 1305 may be performed by a capability signaling transmitting manager 725 as described with reference to FIG. 7.

At 1310, the method may include receiving, from the base station, control signaling indicating a first set of resources for a downlink message from the base station to the first UE. The operations of 1310 may be performed in accordance with examples as disclosed herein. In some examples, aspects of the operations of 1310 may be performed by a control signaling receiving manager 730 as described with reference to FIG. 7.

At 1315, the method may include receiving, from the base station, additional control signaling indicating a second set of resources usable by the first UE to perform CLI measurements on signals transmitted by a second UE, where the second set of resources at least partially overlap with the first set of resources in a time domain. The operations of 1315 may be performed in accordance with examples as disclosed herein. In some examples, aspects of the operations of 1315 may be performed by a control signaling receiving manager 730 as described with reference to FIG. 7.

At 1320, the method may include receiving the downlink message from the base station within the first set of resources based on the indication of the capability. The operations of 1320 may be performed in accordance with examples as disclosed herein. In some examples, aspects of the operations of 1320 may be performed by a downlink message receiving manager 735 as described with reference to FIG. 7.

Figure 14:
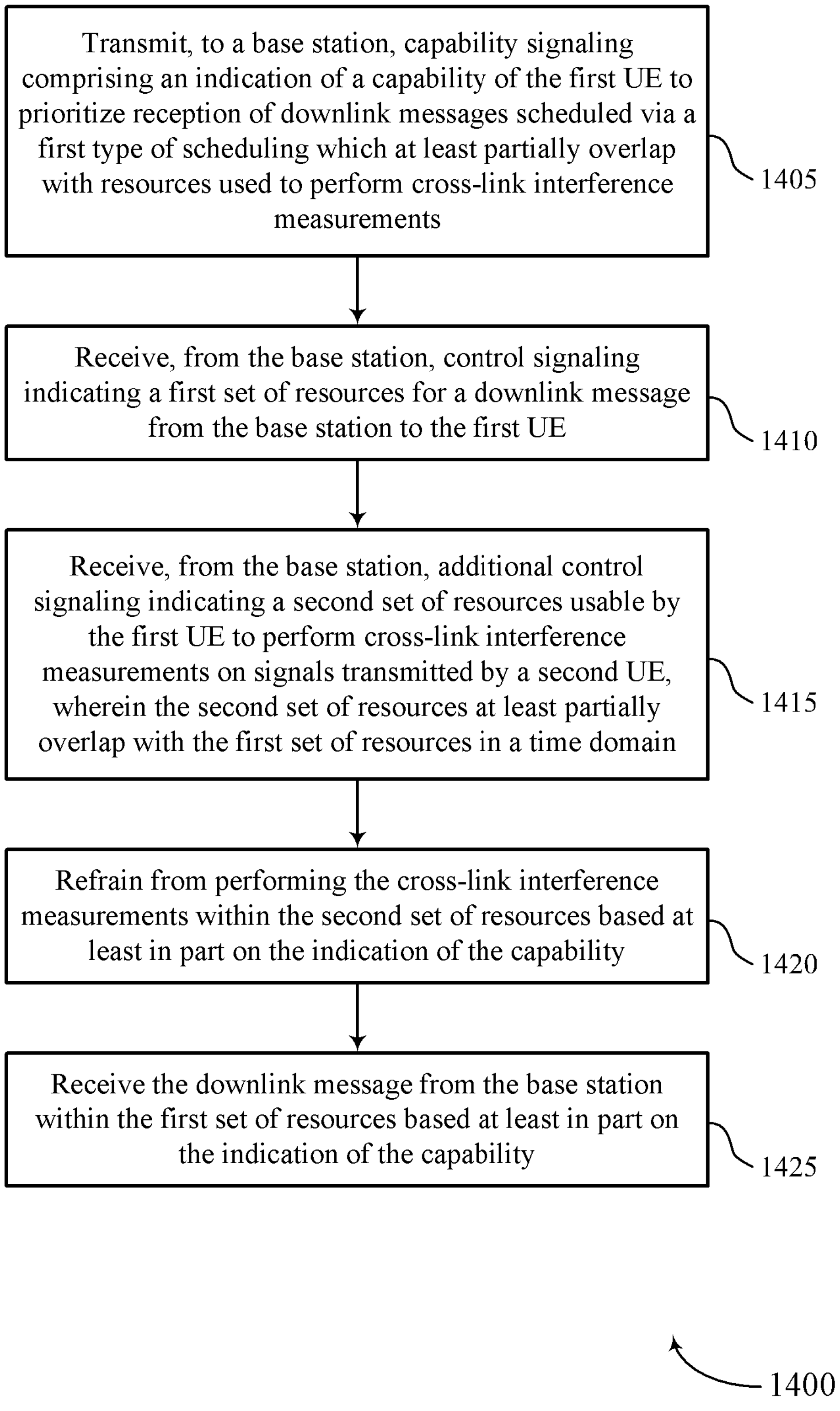

FIG. 14 shows a flowchart illustrating a method 1400 that supports techniques for CLI measurement prioritization in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, capability signaling including an indication of a capability of the first UE to prioritize reception of downlink messages scheduled via a first type of scheduling which at least partially overlap with resources used to perform CLI measurements. The operations of 1405 may be performed in accordance with examples as disclosed herein. In some examples, aspects of the operations of 1405 may be performed by a capability signaling transmitting manager 725 as described with reference to FIG. 7.

At 1410, the method may include receiving, from the base station, control signaling indicating a first set of resources for a downlink message from the base station to the first UE. The operations of 1410 may be performed in accordance with examples as disclosed herein. In some examples, aspects of the operations of 1410 may be performed by a control signaling receiving manager 730 as described with reference to FIG. 7.

At 1415, the method may include receiving, from the base station, additional control signaling indicating a second set of resources usable by the first UE to perform CLI measurements on signals transmitted by a second UE, where the second set of resources at least partially overlap with the first set of resources in a time domain. The operations of 1415 may be performed in accordance with examples as disclosed herein. In some examples, aspects of the operations of 1415 may be performed by a control signaling receiving manager 730 as described with reference to FIG. 7.

At 1420, the method may include refraining from performing the CLI measurements within the second set of resources based on the indication of the capability. The operations of 1420 may be performed in accordance with examples as disclosed herein. In some examples, aspects of the operations of 1420 may be performed by a CLI measurement manager 740 as described with reference to FIG. 7.

At 1425, the method may include receiving the downlink message from the base station within the first set of resources based on the indication of the capability. The operations of 1425 may be performed in accordance with examples as disclosed herein. In some examples, aspects of the operations of 1425 may be performed by a downlink message receiving manager 735 as described with reference to FIG. 7.

Figure 15:
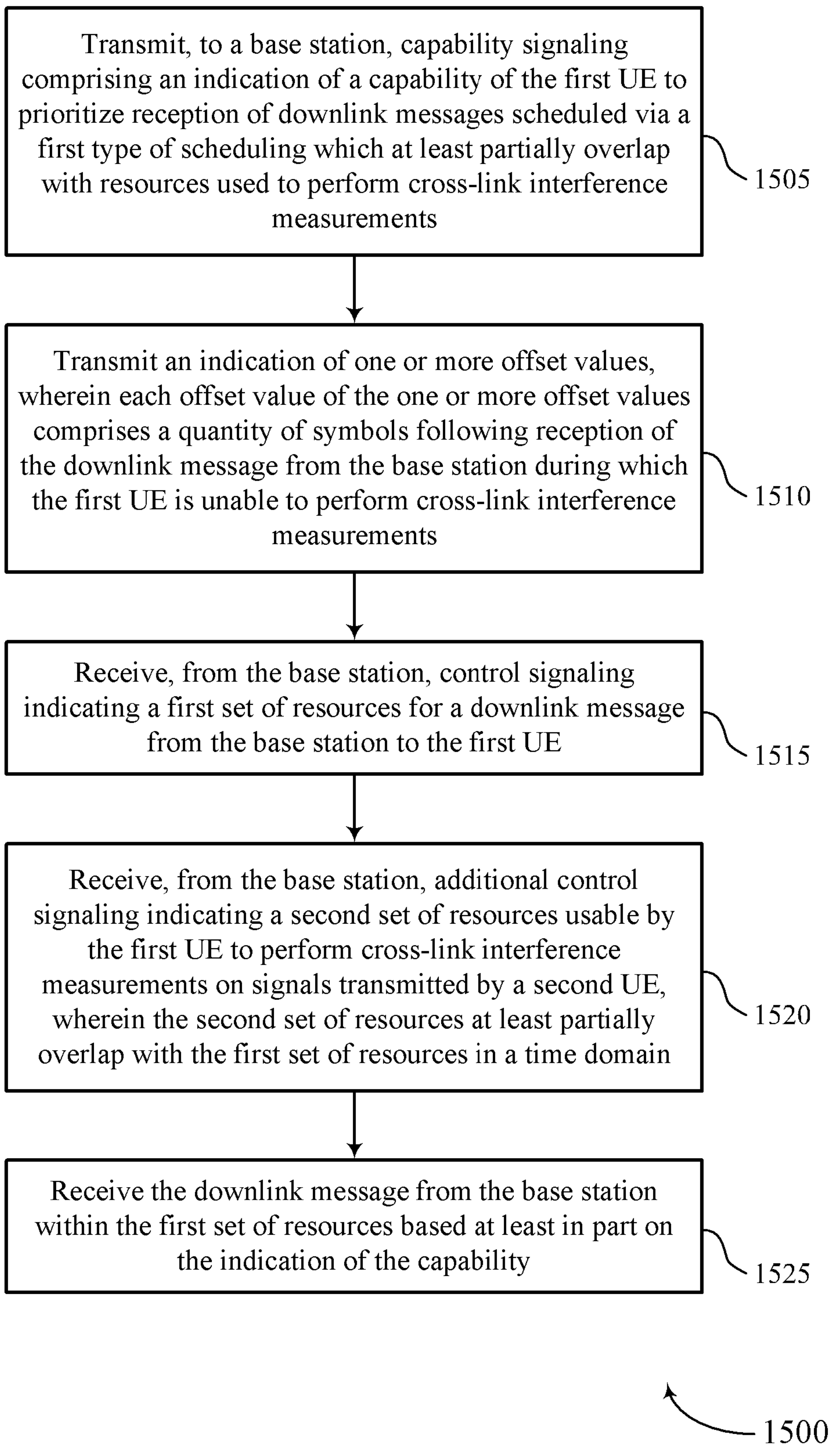

FIG. 15 shows a flowchart illustrating a method 1500 that supports techniques for CLI measurement prioritization in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, capability signaling including an indication of a capability of the first UE to prioritize reception of downlink messages scheduled via a first type of scheduling which at least partially overlap with resources used to perform CLI measurements. The operations of 1505 may be performed in accordance with examples as disclosed herein. In some examples, aspects of the operations of 1505 may be performed by a capability signaling transmitting manager 725 as described with reference to FIG. 7.

At 1510, the method may include transmitting an indication of one or more offset values, where each offset value of the one or more offset values includes a quantity of symbols following reception of the downlink message from the base station during which the first UE is unable to perform CLI measurements. The operations of 1510 may be performed in accordance with examples as disclosed herein. In some examples, aspects of the operations of 1510 may be performed by a capability signaling transmitting manager 725 as described with reference to FIG. 7.

At 1515, the method may include receiving, from the base station, control signaling indicating a first set of resources for a downlink message from the base station to the first UE. The operations of 1515 may be performed in accordance with examples as disclosed herein. In some examples, aspects of the operations of 1515 may be performed by a control signaling receiving manager 730 as described with reference to FIG. 7.

At 1520, the method may include receiving, from the base station, additional control signaling indicating a second set of resources usable by the first UE to perform CLI measurements on signals transmitted by a second UE, where the second set of resources at least partially overlap with the first set of resources in a time domain. The operations of 1520 may be performed in accordance with examples as disclosed herein. In some examples, aspects of the operations of 1520 may be performed by a control signaling receiving manager 730 as described with reference to FIG. 7.

At 1525, the method may include receiving the downlink message from the base station within the first set of resources based on the indication of the capability. The operations of 1525 may be performed in accordance with examples as disclosed herein. In some examples, aspects of the operations of 1525 may be performed by a downlink message receiving manager 735 as described with reference to FIG. 7.

Figure 16:
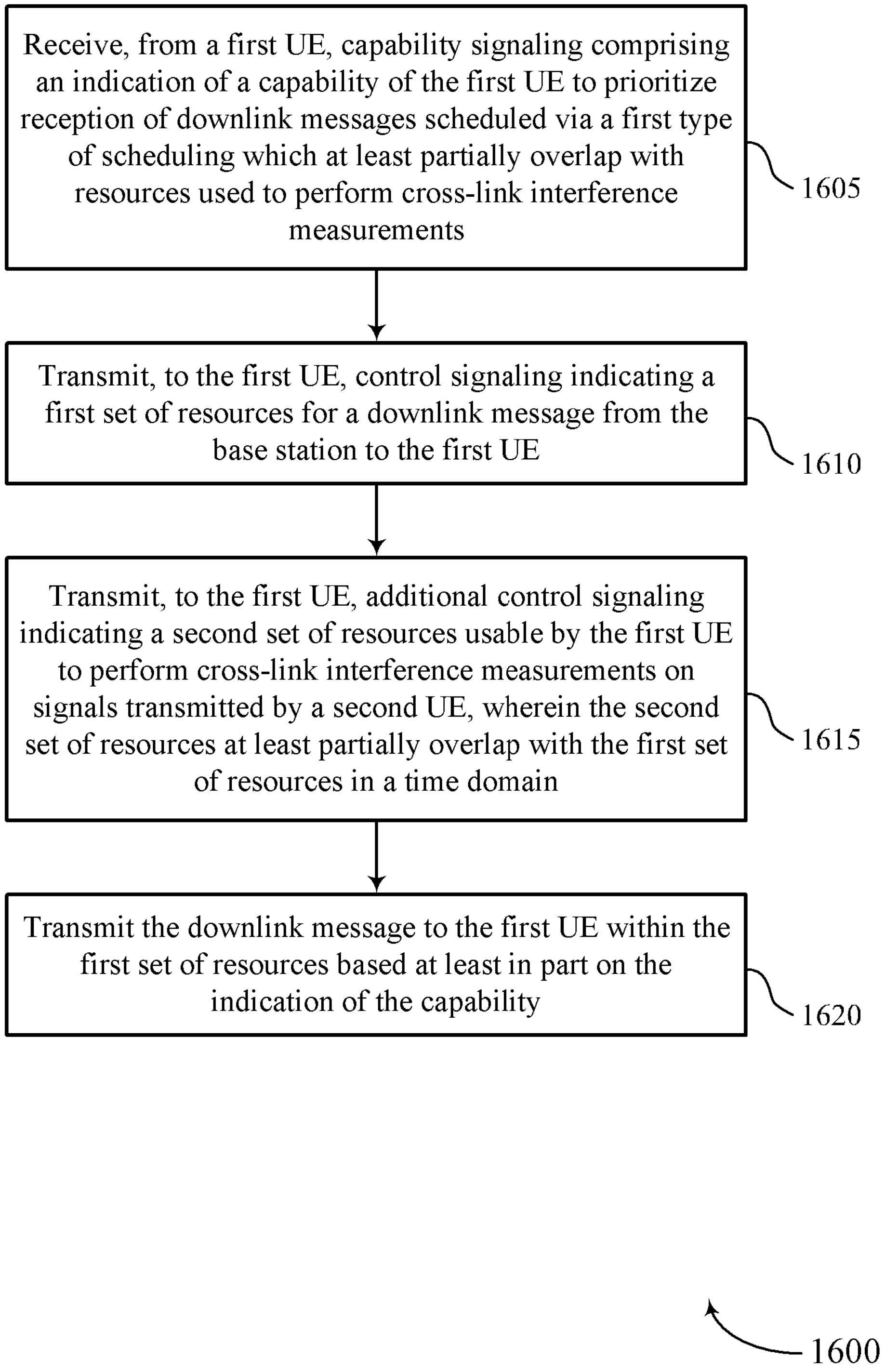

FIG. 16 shows a flowchart illustrating a method 1600 that supports techniques for CLI measurement prioritization in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a first UE, capability signaling including an indication of a capability of the first UE to prioritize reception of downlink messages scheduled via a first type of scheduling which at least partially overlap with resources used to perform CLI measurements. The operations of 1605 may be performed in accordance with examples as disclosed herein. In some examples, aspects of the operations of 1605 may be performed by a capability signaling receiving manager 1125 as described with reference to FIG. 11.

At 1610, the method may include transmitting, to the first UE, control signaling indicating a first set of resources for a downlink message from the base station to the first UE. The operations of 1610 may be performed in accordance with examples as disclosed herein. In some examples, aspects of the operations of 1610 may be performed by a control signaling transmitting manager 1130 as described with reference to FIG. 11.

At 1615, the method may include transmitting, to the first UE, additional control signaling indicating a second set of resources usable by the first UE to perform CLI measurements on signals transmitted by a second UE, where the second set of resources at least partially overlap with the first set of resources in a time domain. The operations of 1615 may be performed in accordance with examples as disclosed herein. In some examples, aspects of the operations of 1615 may be performed by a control signaling transmitting manager 1130 as described with reference to FIG. 11.

At 1620, the method may include transmitting the downlink message to the first UE within the first set of resources based on the indication of the capability. The operations of 1620 may be performed in accordance with examples as disclosed herein. In some examples, aspects of the operations of 1620 may be performed by a downlink message transmitting manager 1135 as described with reference to FIG. 11.

The following provides an overview of aspects of the present disclosure:

Aspect 1: A method for wireless communication at a first UE, comprising: transmitting, to a base station, capability signaling comprising an indication of a capability of the first UE to prioritize reception of downlink messages scheduled via a first type of scheduling which at least partially overlap with resources used to perform CLI measurements; receiving, from the base station, control signaling indicating a first set of resources for a downlink message from the base station to the first UE; receiving, from the base station, additional control signaling indicating a second set of resources usable by the first UE to perform CLI measurements on signals transmitted by a second UE, wherein the second set of resources at least partially overlap with the first set of resources in a time domain; and receiving the downlink message from the base station within the first set of resources based at least in part on the indication of the capability.

Aspect 2: The method of aspect 1, further comprising: refraining from performing the CLI measurements within the second set of resources based at least in part on the indication of the capability.

Aspect 3: The method of aspect 2, wherein the second set of resources comprise a plurality of CLI measurement instances, and wherein refraining from performing the CLI measurements within the second set of resources comprises refraining from performing the CLI measurements within a first CLI measurement instance of the plurality of CLI measurement instances, the method further comprising: receiving one or more signals from the second UE within a second CLI measurement instance of the plurality of CLI measurement instances, wherein the second CLI measurement instance is subsequent to the first CLI measurement instance; and performing the CLI measurements on the one or more signals received within the second CLI measurement instance based at least in part on refraining from performing the CLI measurements within the first CLI measurement instance.

Aspect 4: The method of any of aspects 1 through 3, wherein transmitting the capability signaling comprises: transmitting an indication of one or more offset values, wherein each offset value of the one or more offset values comprises a quantity of symbols following reception of the downlink message from the base station during which the first UE is unable to perform CLI measurements.

Aspect 5: The method of aspect 4, wherein transmitting the capability signaling comprises: transmitting an indication of a first set of one or more characteristics associated with a first offset value; and transmitting an indication of a second set of one or more characteristics associated with a second offset value, wherein the first set of one or more characteristics, the second set of one or more characteristics, or both, comprises an SCS, a frequency range, a type of CLI measurement, or any combination thereof.

Aspect 6: The method of any of aspects 1 through 5, wherein the indication of the capability of the first UE to prioritize reception of downlink messages which at least partially overlap with resources used to perform CLI measurements further comprises an indication of a second capability of the UE to support one or more pre-defined offset values, each pre-defined offset value of the one or more pre-defined offset values comprises a quantity of symbols following reception of the downlink message during which the first UE is unable to perform CLI measurements.

Aspect 7: The method of any of aspects 1 through 6, wherein transmitting the capability signaling comprises: transmitting an indication of a first priority configuration associated with a first relative priority between reception of downlink messages scheduled via the first type of scheduling and CLI-RSSI measurements; and transmitting an indication of a second priority configuration associated with a second relative priority between reception of downlink messages scheduled via the first type of scheduling and SRS-RSRP CLI measurements, wherein the first UE receives the downlink message in accordance with the first priority configuration or the second priority configuration.

Aspect 8: The method of aspect 7, wherein transmitting the capability signaling comprises: transmitting an indication of a first set of one or more parameters associated with the first priority configuration, the first set of one or more parameters associated with a first capability of the first UE to prioritize reception of downlink messages scheduled via the first type of scheduling over CLI-RSSI measurements; and transmitting an indication of a second set of one or more parameters associated with the second priority configuration, the second set of one or more parameters different from the first set of one or more parameters, the second set of one or more parameters associated with a second capability of the first UE to prioritize reception of downlink messages scheduled via the first type of scheduling over SRS-RSRP CLI measurements.

Aspect 9: The method of any of aspects 1 through 8, wherein transmitting the capability signaling comprises: transmitting an indication of a first priority configuration associated with a first downlink channel, a first type of downlink message, or both, the first priority configuration associated with a first relative priority between reception of downlink messages scheduled via the first type of scheduling and CLI measurements; and transmitting an indication of a second priority configuration associated with a second downlink channel, a second type of downlink message, or both, the second priority configuration associated with a second relative priority between reception of downlink messages scheduled via the first type of scheduling and CLI measurements, wherein the first UE receives the downlink message in accordance with the first priority configuration or the second priority configuration.

Aspect 10: The method of any of aspects 1 through 9, wherein the first type of scheduling comprises semi-static scheduling, SPS, or both, and a second type of scheduling different from the first type of scheduling comprises dynamic scheduling.

Aspect 11: The method of any of aspects 1 through 10, further comprising: identifying a FFT window for receiving the downlink message based at least in part on transmitting the capability signaling, receiving the control signaling, or both, wherein the downlink message is received based at least in part on the identified FFT window.

Aspect 12: The method of any of aspects 1 through 11, further comprising: receiving, from the base station, a control message indicating an activation of the first set of resources, wherein receiving the downlink message is based at least in part on receiving the control message.

Aspect 13: The method of any of aspects 1 through 12, wherein the indication of the capability of the first UE to prioritize reception of downlink messages which at least partially overlap with resources used to perform CLI measurements further comprises an indication of a second capability of the UE to support one or more pre-defined offset values, each pre-defined offset value of the one or more pre-defined offset values comprises a quantity of symbols following reception of the downlink message during which the first UE is unable to perform CLI measurements.

Aspect 14: A method for wireless communication at a base station, comprising: receiving, from a first UE, capability signaling comprising an indication of a capability of the first UE to prioritize reception of downlink messages scheduled via a first type of scheduling which at least partially overlap with resources used to perform CLI measurements; transmitting, to the first UE, control signaling indicating a first set of resources for a downlink message from the base station to the first UE; transmitting, to the first UE, additional control signaling indicating a second set of resources usable by the first UE to perform CLI measurements on signals transmitted by a second UE, wherein the second set of resources at least partially overlap with the first set of resources in a time domain; and transmitting the downlink message to the first UE within the first set of resources based at least in part on the indication of the capability.

Aspect 15: The method of aspect 14, wherein receiving the capability signaling comprises: receiving an indication of one or more offset values, wherein each offset value of the one or more offset values comprises a quantity of symbols following reception of the downlink message from the base station during which the first UE is unable to perform CLI measurements.

Aspect 16: The method of aspect 15, wherein receiving the capability signaling comprises: receiving an indication of a first set of one or more characteristics associated with a first offset value; and receiving an indication of a second set of one or more characteristics associated with a second offset value, wherein the first set of one or more characteristics, the second set of one or more characteristics, or both, comprises an SCS, a frequency range, a type of CLI measurement, or any combination thereof.

Aspect 17: The method of any of aspects 14 through 16, wherein receiving the capability signaling comprises: receiving an indication of a first priority configuration associated with a first relative priority between reception of downlink messages scheduled via the first type of scheduling and CLI-RSSI measurements; and receiving an indication of a second priority configuration associated with a second relative priority between reception of downlink messages scheduled via the first type of scheduling and SRS-RSRP CLI measurements, wherein the base station transmits the downlink message in accordance with the first priority configuration or the second priority configuration.

Aspect 18: The method of aspect 17, wherein receiving the capability signaling comprises: receiving an indication of a first set of one or more parameters associated with the first priority configuration, the first set of one or more parameters associated with a first capability of the first UE to prioritize reception of downlink messages scheduled via the first type of scheduling over CLI-RSSI measurements; and receiving an indication of a second set of one or more parameters associated with the second priority configuration, the second set of one or more parameters different from the first set of one or more parameters, the second set of one or more parameters associated with a second capability of the first UE to prioritize reception of downlink messages scheduled via the first type of scheduling over SRS-RSRP CLI measurements.

Aspect 19: The method of any of aspects 14 through 18, wherein receiving the capability signaling comprises: receiving an indication of a first priority configuration associated with a first downlink channel, a first type of downlink message, or both, the first priority configuration associated with a first relative priority between reception of downlink messages scheduled via the first type of scheduling and CLI measurements; and receiving an indication of a second priority configuration associated with a second downlink channel, a second type of downlink message, or both, the second priority configuration associated with a second relative priority between reception of downlink messages scheduled via the first type of scheduling and CLI measurements, wherein the base station transmits the downlink message in accordance with the first priority configuration or the second priority configuration.

Aspect 20: The method of any of aspects 14 through 19, wherein the first type of scheduling comprises semi-static scheduling, SPS, or both, and a second type of scheduling different from the first type of scheduling comprises dynamic scheduling.

Aspect 21: The method of any of aspects 14 through 20, further comprising: transmitting, to the first UE, a control message indicating an activation of the first set of resources, wherein transmitting the downlink message is based at least in part on transmitting the control message.

Aspect 22: An apparatus for wireless communication at a first UE, comprising a processor; memory coupled with the processor; and instructions stored in the memory and executable by the processor to cause the apparatus to perform a method of any of aspects 1 through 13.

Aspect 23: An apparatus for wireless communication at a first UE, comprising at least one means for performing a method of any of aspects 1 through 13.

Aspect 24: A non-transitory computer-readable medium storing code for wireless communication at a first UE, the code comprising instructions executable by a processor to perform a method of any of aspects 1 through 13.

Aspect 25: An apparatus for wireless communication at a base station, comprising a processor; memory coupled with the processor; and instructions stored in the memory and executable by the processor to cause the apparatus to perform a method of any of aspects 14 through 21.

Aspect 26: An apparatus for wireless communication at a base station, comprising at least one means for performing a method of any of aspects 14 through 21.

Aspect 27: A non-transitory computer-readable medium storing code for wireless communication at a base station, the code comprising instructions executable by a processor to perform a method of any of aspects 14 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:

at least one processor;

memory coupled with the at least one processor; and instructions stored in the memory and executable by the at least one processor to cause the apparatus to:

transmit, to a network entity, capability signaling comprising an indication of a capability of the first UE to prioritize reception of downlink messages scheduled via a first type of scheduling which at least partially overlap with resources used to perform cross-link interference measurements;

receive, from the network entity, control signaling indicating a first set of resources for a downlink message from the network entity to the first UE;

receive, from the network entity, additional control signaling indicating a second set of resources usable by the first UE to perform cross-link interference measurements on signals transmitted by a second UE, wherein the second set of resources at least partially overlap with the first set of resources in a time domain; and receive the downlink message from the network entity within the first set of resources based at least in part on the indication of the capability.

2. The apparatus of claim 1, wherein the instructions are further executable by the at least one processor to cause the apparatus to:

refrain from performing the cross-link interference measurements within the second set of resources based at least in part on the indication of the capability.

3. The apparatus of claim 2, wherein the second set of resources comprise a plurality of cross-link interference measurement instances, and wherein refraining from performing the cross-link interference measurements within the second set of resources comprises refraining from performing the cross-link interference measurements within a first cross-link interference measurement instance of the plurality of cross-link interference measurement instances, wherein the instructions are further executable by the at least one processor to cause the apparatus to:

receive one or more signals from the second UE within a second cross-link interference measurement instance of the plurality of cross-link interference measurement instances, wherein the second cross-link interference measurement instance is subsequent to the first cross-link interference measurement instance; and perform the cross-link interference measurements on the one or more signals received within the second cross-link interference measurement instance based at least in part on refraining from performing the cross-link interference measurements within the first cross-link interference measurement instance.

4. The apparatus of claim 1, wherein the instructions to transmit the capability signaling are executable by the at least one processor to cause the apparatus to:

transmit an indication of one or more offset values, wherein each offset value of the one or more offset values comprises a quantity of symbols following reception of the downlink message from the network entity during which the first UE is unable to perform cross-link interference measurements.

5. The apparatus of claim 4, wherein the instructions to transmit the capability signaling are executable by the at least one processor to cause the apparatus to:

transmit an indication of a first set of one or more characteristics associated with a first offset value; and transmit an indication of a second set of one or more characteristics associated with a second offset value, wherein the first set of one or more characteristics, the second set of one or more characteristics, or both, comprises a subcarrier spacing, a frequency range, a type of cross-link interference measurement, or any combination thereof.

6. The apparatus of claim 1, wherein the indication of the capability of the first UE to prioritize reception of downlink messages which at least partially overlap with resources used to perform cross-link interference measurements further comprises an indication of a second capability of the UE to support one or more pre-defined offset values, wherein each pre-defined offset value of the one or more pre-defined offset values comprises a quantity of symbols following reception of the downlink message during which the first UE is unable to perform cross-link interference measurements.

7. The apparatus of claim 1, wherein the instructions to transmit the capability signaling are executable by the at least one processor to cause the apparatus to:

transmit an indication of a first priority configuration associated with a first relative priority between reception of downlink messages scheduled via the first type of scheduling and cross-link interference-received signal strength indicator measurements; and transmit an indication of a second priority configuration associated with a second relative priority between reception of downlink messages scheduled via the first type of scheduling and sounding reference signal-reference signal received power cross-link interference measurements, wherein the first UE receives the downlink message in accordance with the first priority configuration or the second priority configuration.

8. The apparatus of claim 7, wherein the instructions to transmit the capability signaling are executable by the at least one processor to cause the apparatus to:

transmit an indication of a first set of one or more parameters associated with the first priority configuration, the first set of one or more parameters associated with a first capability of the first UE to prioritize reception of downlink messages scheduled via the first type of scheduling over cross-link interference-received signal strength indicator measurements; and transmit an indication of a second set of one or more parameters associated with the second priority configuration, the second set of one or more parameters different from the first set of one or more parameters, the second set of one or more parameters associated with a second capability of the first UE to prioritize reception of downlink messages scheduled via the first type of scheduling over sounding reference signal-reference signal received power cross-link interference measurements.

9. The apparatus of claim 1, wherein the instructions to transmit the capability signaling are executable by the at least one processor to cause the apparatus to:

transmit an indication of a first priority configuration associated with a first downlink channel, a first type of downlink message, or both, the first priority configuration associated with a first relative priority between reception of downlink messages scheduled via the first type of scheduling and cross-link interference measurements; and transmit an indication of a second priority configuration associated with a second downlink channel, a second type of downlink message, or both, the second priority configuration associated with a second relative priority between reception of downlink messages scheduled via the first type of scheduling and cross-link interference measurements, wherein the first UE receives the downlink message in accordance with the first priority configuration or the second priority configuration.

10. The apparatus of claim 1, wherein the first type of scheduling comprises semi-static scheduling, semi-persistent scheduling, or both, and wherein a second type of scheduling different from the first type of scheduling comprises dynamic scheduling.

11. The apparatus of claim 1, wherein the instructions are further executable by the at least one processor to cause the apparatus to:

identify a Fast Fourier transform window for receiving the downlink message based at least in part on transmitting the capability signaling, receiving the control signaling, or both, wherein the downlink message is received based at least in part on the identified Fast Fourier transform window.

12. The apparatus of claim 1, wherein the instructions are further executable by the at least one processor to cause the apparatus to:

receive, from the network entity, a control message indicating an activation of the first set of resources, wherein receiving the downlink message is based at least in part on receiving the control message.

13. An apparatus for wireless communication at a network entity, comprising:

at least one processor;

memory coupled with the at least one processor; and instructions stored in the memory and executable by the at least one processor to cause the apparatus to:

receive, from a first user equipment (UE), capability signaling comprising an indication of a capability of the first UE to prioritize reception of downlink messages scheduled via a first type of scheduling which at least partially overlap with resources used to perform cross-link interference measurements;

transmit, to the first UE, control signaling indicating a first set of resources for a downlink message from the network entity to the first UE;

transmit, to the first UE, additional control signaling indicating a second set of resources usable by the first UE to perform cross-link interference measurements on signals transmitted by a second UE, wherein the second set of resources at least partially overlap with the first set of resources in a time domain; and transmit the downlink message to the first UE within the first set of resources based at least in part on the indication of the capability.

14. The apparatus of claim 13, wherein the instructions to receive the capability signaling are executable by the at least one processor to cause the apparatus to:

receive an indication of one or more offset values, wherein each offset value of the one or more offset values comprises a quantity of symbols following reception of the downlink message from the network entity during which the first UE is unable to perform cross-link interference measurements.

15. The apparatus of claim 13, wherein the indication of the capability of the first UE to prioritize reception of downlink messages which at least partially overlap with resources used to perform cross-link interference measurements further comprises an indication of a second capability of the UE to support one or more pre-defined offset values, wherein each pre-defined offset value of the one or more pre-defined offset values comprises a quantity of symbols following reception of the downlink message during which the first UE is unable to perform cross-link interference measurements.

16. The apparatus of claim 14, wherein the instructions to receive the capability signaling are executable by the at least one processor to cause the apparatus to:

receive an indication of a first set of one or more characteristics associated with a first offset value; and receive an indication of a second set of one or more characteristics associated with a second offset value, wherein the first set of one or more characteristics, the second set of one or more characteristics, or both, comprises a subcarrier spacing, a frequency range, a type of cross-link interference measurement, or any combination thereof.

17. The apparatus of claim 13, wherein the instructions to receive the capability signaling are executable by the at least one processor to cause the apparatus to:

receive an indication of a first priority configuration associated with a first relative priority between reception of downlink messages scheduled via the first type of scheduling and cross-link interference-received signal strength indicator measurements; and receive an indication of a second priority configuration associated with a second relative priority between reception of downlink messages scheduled via the first type of scheduling and sounding reference signal-reference signal received power cross-link interference measurements, wherein the network entity transmits the downlink message in accordance with the first priority configuration or the second priority configuration.

18. The apparatus of claim 17, wherein the instructions to receive the capability signaling are executable by the at least one processor to cause the apparatus to:

receive an indication of a first set of one or more parameters associated with the first priority configuration, the first set of one or more parameters associated with a first capability of the first UE to prioritize reception of downlink messages scheduled via the first type of scheduling over cross-link interference-received signal strength indicator measurements; and receive an indication of a second set of one or more parameters associated with the second priority configuration, the second set of one or more parameters different from the first set of one or more parameters, the second set of one or more parameters associated with a second capability of the first UE to prioritize reception of downlink messages scheduled via the first type of scheduling over sounding reference signal-reference signal received power cross-link interference measurements.

19. The apparatus of claim 13, wherein the instructions to receive the capability signaling are executable by the at least one processor to cause the apparatus to:

receive an indication of a first priority configuration associated with a first downlink channel, a first type of downlink message, or both, the first priority configuration associated with a first relative priority between reception of downlink messages scheduled via the first type of scheduling and cross-link interference measurements; and receive an indication of a second priority configuration associated with a second downlink channel, a second type of downlink message, or both, the second priority configuration associated with a second relative priority between reception of downlink messages scheduled via the first type of scheduling and cross-link interference measurements, wherein the network entity transmits the downlink message in accordance with the first priority configuration or the second priority configuration.

20. The apparatus of claim 13, wherein the first type of scheduling comprises semi-static scheduling, semi-persistent scheduling, or both, and wherein a second type of scheduling different from the first type of scheduling comprises dynamic scheduling.

21. The apparatus of claim 13, wherein the instructions are further executable by the at least one processor to cause the apparatus to:

transmit, to the first UE, a control message indicating an activation of the first set of resources, wherein transmitting the downlink message is based at least in part on transmitting the control message.

22. A method for wireless communication at a first user equipment (UE), comprising:

transmitting, to a network entity, capability signaling comprising an indication of a capability of the first UE to prioritize reception of downlink messages scheduled via a first type of scheduling which at least partially overlap with resources used to perform cross-link interference measurements;

receiving, from the network entity, control signaling indicating a first set of resources for a downlink message from the network entity to the first UE;

receiving, from the network entity, additional control signaling indicating a second set of resources usable by the first UE to perform cross-link interference measurements on signals transmitted by a second UE, wherein the second set of resources at least partially overlap with the first set of resources in a time domain; and receiving the downlink message from the network entity within the first set of resources based at least in part on the indication of the capability.

23. The method of claim 22, further comprising:

refraining from performing the cross-link interference measurements within the second set of resources based at least in part on the indication of the capability.

24. The method of claim 23, wherein the second set of resources comprise a plurality of cross-link interference measurement instances, and wherein refraining from performing the cross-link interference measurements within the second set of resources comprises refraining from performing the cross-link interference measurements within a first cross-link interference measurement instance of the plurality of cross-link interference measurement instances, the method further comprising:

receiving one or more signals from the second UE within a second cross-link interference measurement instance of the plurality of cross-link interference measurement instances, wherein the second cross-link interference measurement instance is subsequent to the first cross-link interference measurement instance; and performing the cross-link interference measurements on the one or more signals received within the second cross-link interference measurement instance based at least in part on refraining from performing the cross-link interference measurements within the first cross-link interference measurement instance.

25. The method of claim 22, wherein transmitting the capability signaling comprises:

transmitting an indication of one or more offset values, wherein each offset value of the one or more offset values comprises a quantity of symbols following reception of the downlink message from the network entity during which the first UE is unable to perform cross-link interference measurements.

26. The method of claim 25, wherein transmitting the capability signaling comprises:

transmitting an indication of a first set of one or more characteristics associated with a first offset value; and transmitting an indication of a second set of one or more characteristics associated with a second offset value, wherein the first set of one or more characteristics, the second set of one or more characteristics, or both, comprises a subcarrier spacing, a frequency range, a type of cross-link interference measurement, or any combination thereof.

27. The method of claim 22, wherein the indication of the capability of the first UE to prioritize reception of downlink messages which at least partially overlap with resources used to perform cross-link interference measurements further comprises an indication of a second capability of the UE to support one or more pre-defined offset values, wherein each pre-defined offset value of the one or more pre-defined offset values comprises a quantity of symbols following reception of the downlink message during which the first UE is unable to perform cross-link interference measurements.

28. The method of claim 22, wherein transmitting the capability signaling comprises:

transmitting an indication of a first priority configuration associated with a first relative priority between reception of downlink messages scheduled via the first type of scheduling and cross-link interference-received signal strength indicator measurements; and transmitting an indication of a second priority configuration associated with a second relative priority between reception of downlink messages scheduled via the first type of scheduling and sounding reference signal-reference signal received power cross-link interference measurements, wherein the first UE receives the downlink message in accordance with the first priority configuration or the second priority configuration.

29. The method of claim 28, wherein transmitting the capability signaling comprises:

transmitting an indication of a first set of one or more parameters associated with the first priority configuration, the first set of one or more parameters associated with a first capability of the first UE to prioritize reception of downlink messages scheduled via the first type of scheduling over cross-link interference-received signal strength indicator measurements; and transmitting an indication of a second set of one or more parameters associated with the second priority configuration, the second set of one or more parameters different from the first set of one or more parameters, the second set of one or more parameters associated with a second capability of the first UE to prioritize reception of downlink messages scheduled via the first type of scheduling over sounding reference signal-reference signal received power cross-link interference measurements.

30. A method for wireless communication at a network entity, comprising:

receiving, from a first user equipment (UE), capability signaling comprising an indication of a capability of the first UE to prioritize reception of downlink messages scheduled via a first type of scheduling which at least partially overlap with resources used to perform cross-link interference measurements;

transmitting, to the first UE, control signaling indicating a first set of resources for a downlink message from the network entity to the first UE;

transmitting, to the first UE, additional control signaling indicating a second set of resources usable by the first UE to perform cross-link interference measurements on signals transmitted by a second UE, wherein the second set of resources at least partially overlap with the first set of resources in a time domain; and transmitting the downlink message to the first UE within the first set of resources based at least in part on the indication of the capability.

* * * * *